(12) United States Patent
Numata

(10) Patent No.: US 10,887,527 B2
(45) Date of Patent: Jan. 5, 2021

(54) IMAGE CAPTURE APPARATUS HAVING ILLUMINATION SECTION, MONITORING SYSTEM INCLUDING IMAGE CAPTURE APPARATUS, METHOD OF CONTROLLING IMAGE CAPTURE APPARATUS, AND STORAGE MEDIUM

(71) Applicant: CANON KABUSHIKI KAISHA, Tokyo (JP)

(72) Inventor: Aihiko Numata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/549,314

(22) Filed: Aug. 23, 2019

(65) Prior Publication Data
US 2020/0077007 A1   Mar. 5, 2020

(30) Foreign Application Priority Data

Aug. 30, 2018 (JP) ................. 2018-161685

(51) Int. Cl.
*H04N 5/235*  (2006.01)
*H04N 5/247*  (2006.01)
*H04N 5/225*  (2006.01)

(52) U.S. Cl.
CPC ......... *H04N 5/2352* (2013.01); *H04N 5/2254* (2013.01); *H04N 5/2256* (2013.01); *H04N 5/2351* (2013.01); *H04N 5/247* (2013.01)

(58) Field of Classification Search
CPC .. H04N 5/2353; H04N 5/23238; H04N 7/183; H04N 7/181; G08B 13/19626; G08B 13/19641; G08B 13/1963; G03B 37/02; G03B 15/02
See application file for complete search history.

(56) References Cited

U.S. PATENT DOCUMENTS

| | | |
|---|---|---|
| 5,657,073 A | 8/1997 | Henley |
| 6,778,207 B1 | 8/2004 | Lee et al. |
| 2004/0212677 A1 | 10/2004 | Uebbing |

(Continued)

FOREIGN PATENT DOCUMENTS

JP   2013-041282 A   2/2013

OTHER PUBLICATIONS

Jan. 31, 2020 European Search Report in European Patent Appln. No. 19193874.5.

*Primary Examiner* — Farzana Hossain
(74) *Attorney, Agent, or Firm* — Venable LLP

(57) ABSTRACT

An image capture apparatus capable of improving the quality of an image captured using illumination. A multi-eye image capture section has image capture sections that capture images in different image capture ranges partially overlapping with each other to generate a wide-angle image. A single-eye image capture section captures an image in part of the image capture ranges of the multi-eye image capture section and changes an image capture direction. When performing image capture using illumination, the exposure level of a first image capture section of the multi-eye image capture section, having an image capture range overlapping with the image capture range of the single-eye image capture section is controlled to be lower than the exposure level of a second image capture section having an image capture range not overlapping with the image capture range of the single-eye image capture section.

18 Claims, 13 Drawing Sheets

(56) References Cited

U.S. PATENT DOCUMENTS

| | | |
|---|---|---|
| 2009/0147071 A1 | 6/2009 | Jones et al. |
| 2013/0044225 A1 * | 2/2013 | Jeon |
| 2017/0064171 A1 * | 3/2017 | Imagawa ............... G03B 15/05 |
| 2019/0132501 A1 * | 5/2019 | Numata ............... H04N 5/2354 |
| 2019/0132559 A1 | 5/2019 | Numata |
| 2019/0222734 A1 * | 7/2019 | Numata ............... H04N 5/2258 |

\* cited by examiner

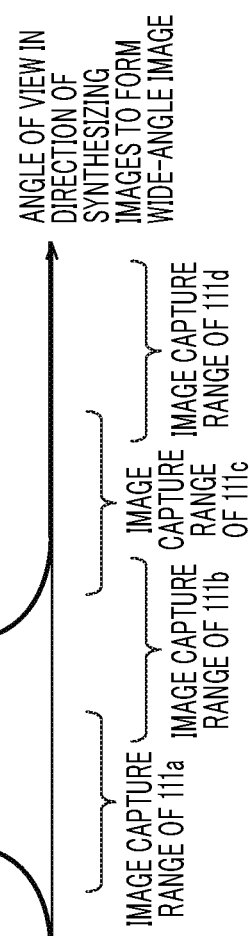
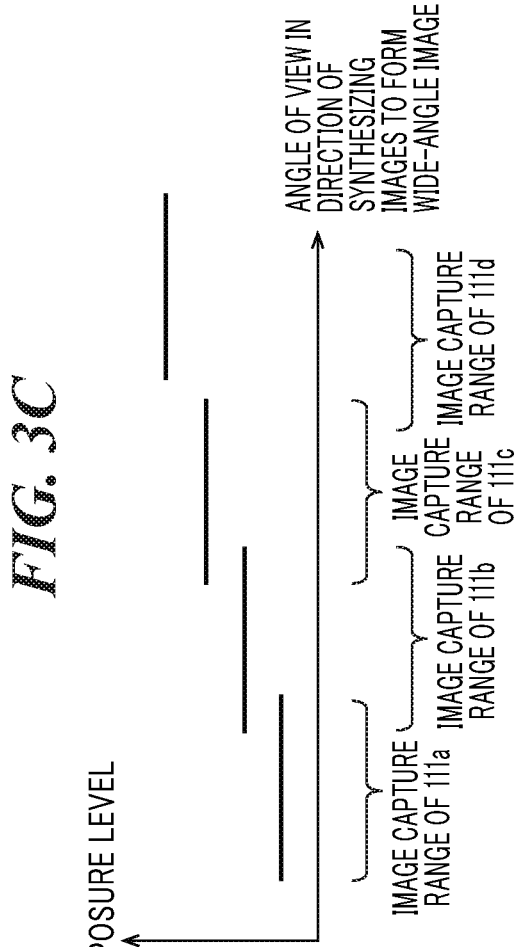
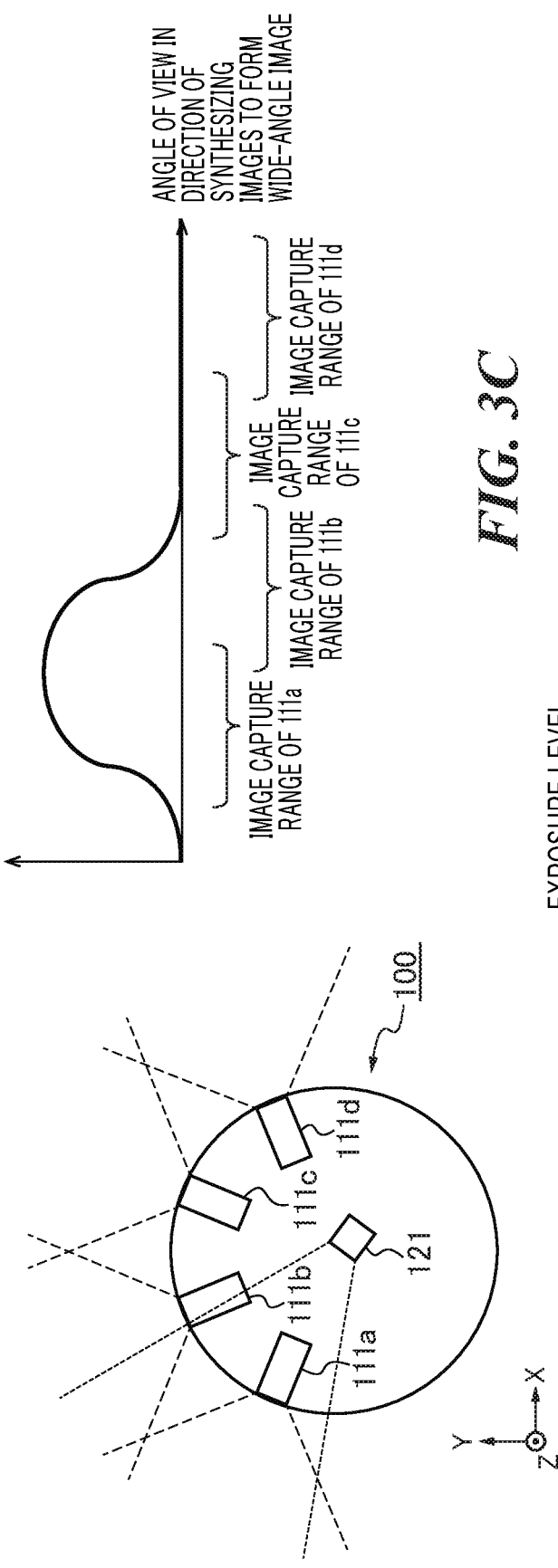

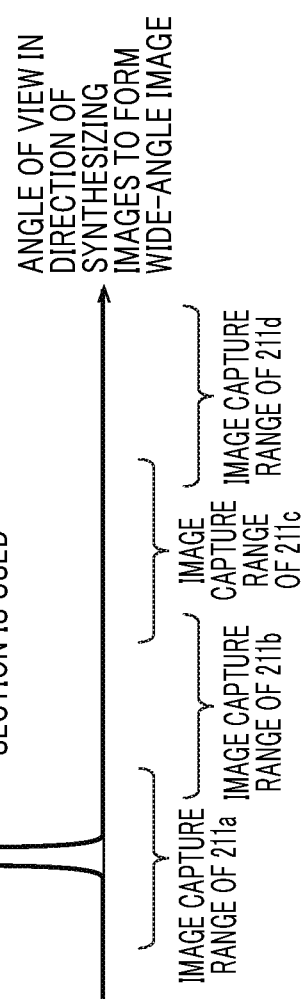
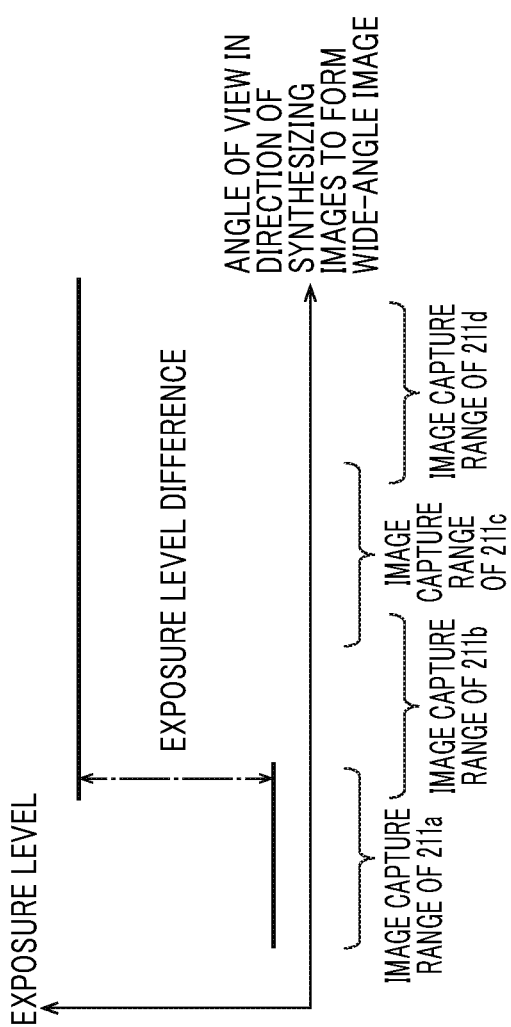
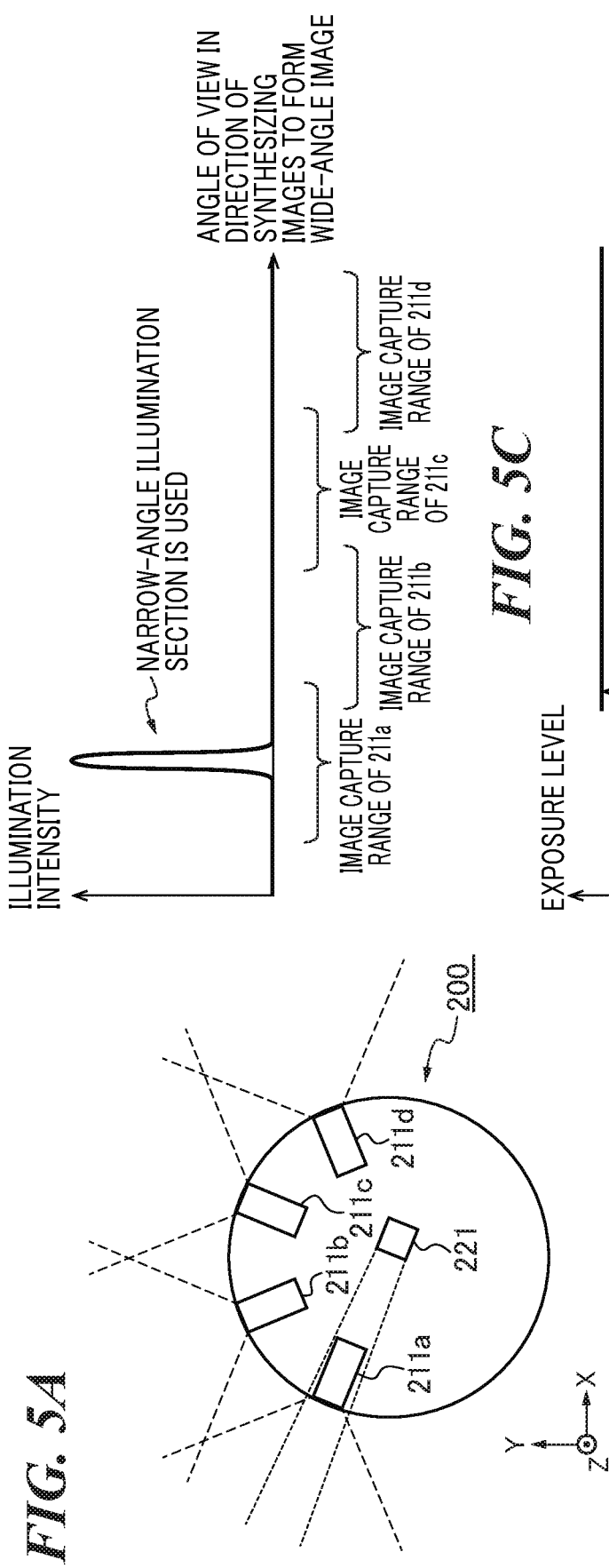

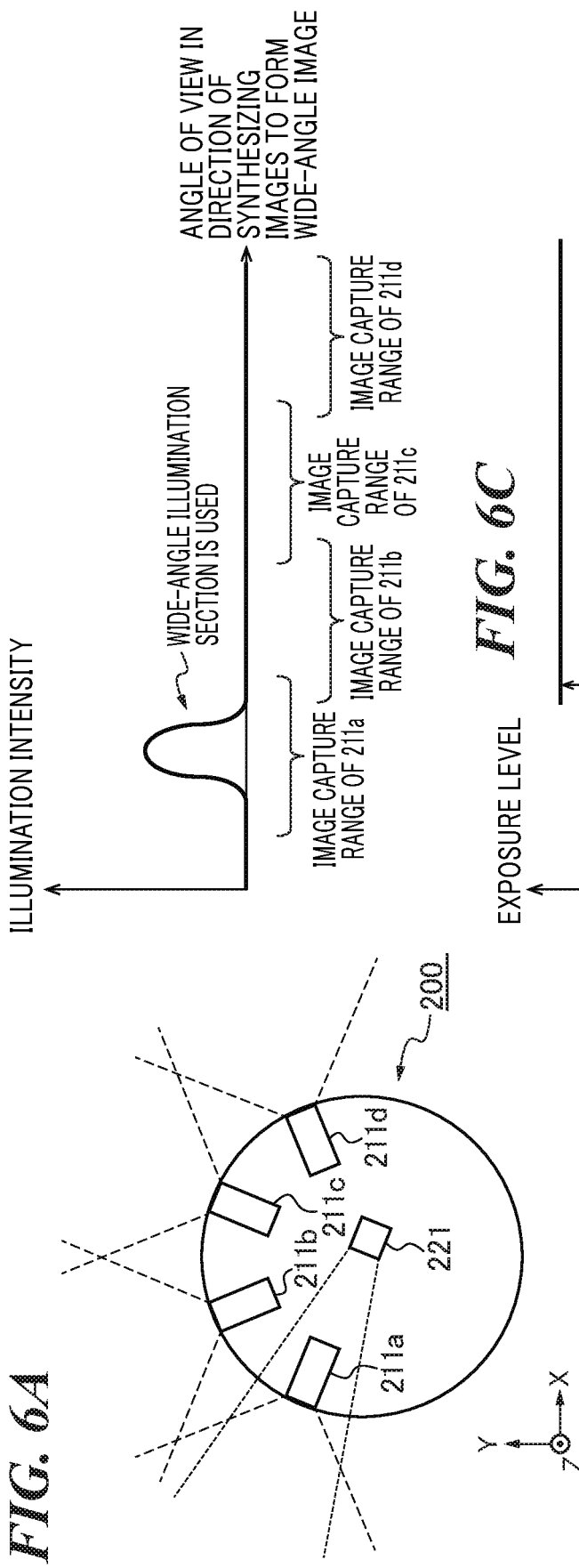

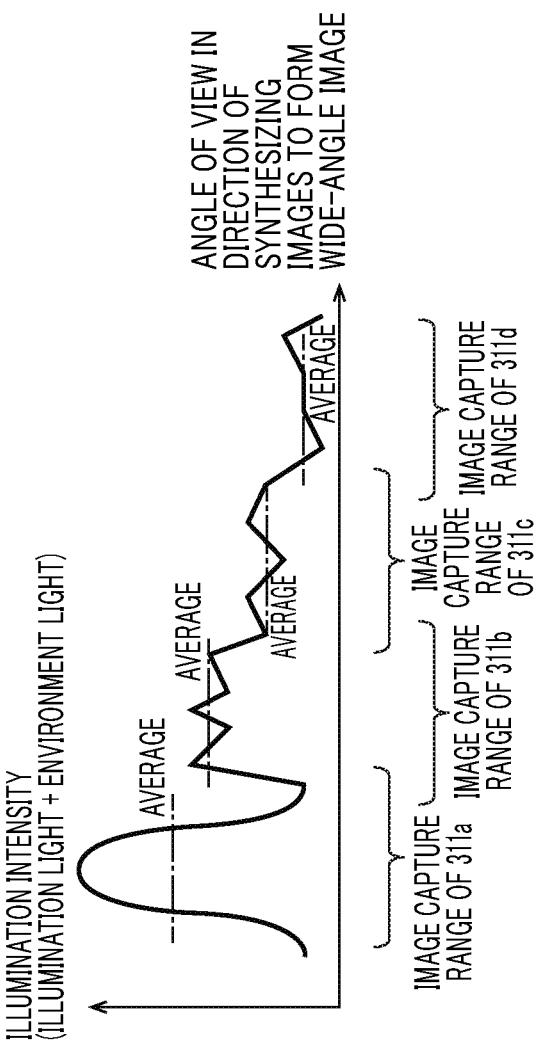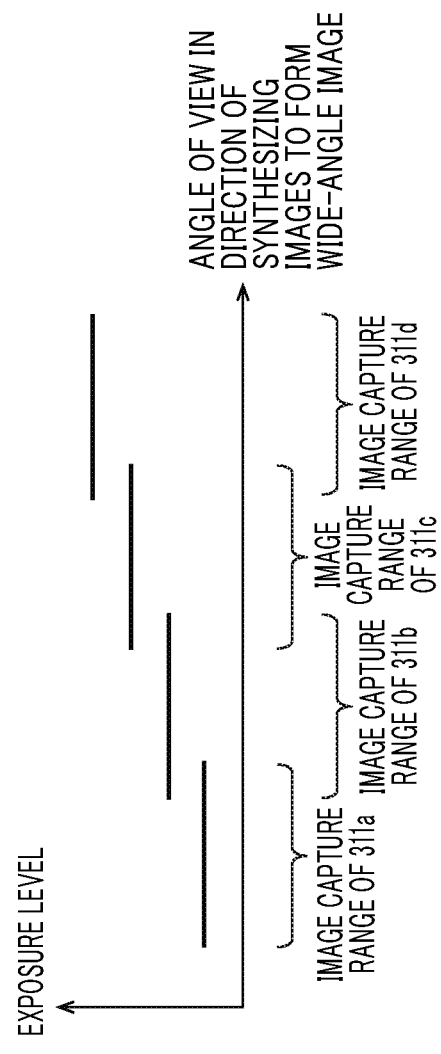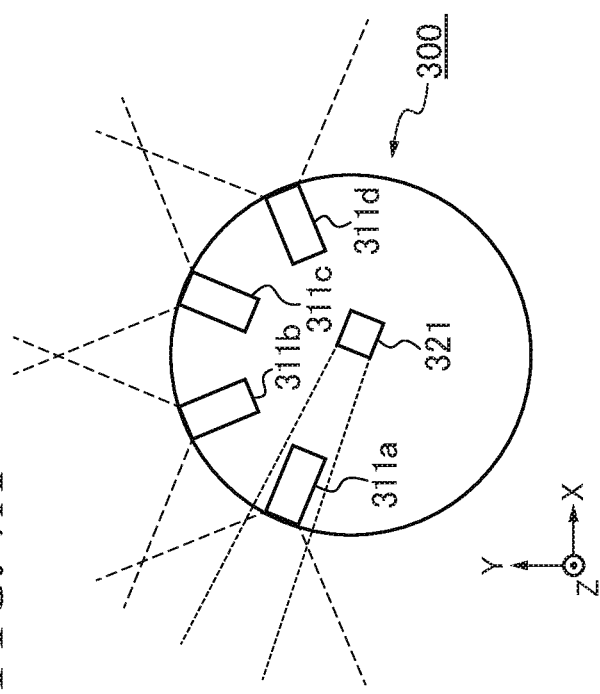

FIG. 9

| FOCAL LENGTH | FOCUS LENS POSITION AT TIME WHEN VISIBLE LIGHT ENTERS | FOCUS LENS POSITION AT TIME WHEN INFRARED LIGHT ENTERS |
|---|---|---|
| L_1 | PVI_1 | PIR_1 |
| L_2 | PVI_2 | PIR_2 |
| L_3 | PVI_3 | PIR_3 |
| ⋮ | ⋮ | ⋮ |

FIG. 10

| INSERTION/REMOVAL OF INFRARED CUT FILTERS OF MULTI-EYE IMAGE CAPTURE SECTION | INSERTION/REMOVAL OF INFRARED CUT FILTER OF SINGLE-EYE IMAGE CAPTURE SECTION | USE/NON-USE OF ILLUMINATION SECTION | EXPOSURE LEVEL ADJUSTMENT FOR MULTI-EYE IMAGE CAPTURE SECTION ACCORDING TO IMAGE CAPTURE DIRECTION OF SINGLE-EYE IMAGE CAPTURE SECTION |
|---|---|---|---|
| INSERT | INSERT | NOT USE | NOT ADJUST |
| INSERT | REMOVE | USE | NOT ADJUST |
| REMOVE | INSERT | NOT USE | NOT ADJUST |
| REMOVE | INSERT | USE | ADJUST |
| REMOVE | REMOVE | USE | ADJUST |

FIG. 11A

CASE WHERE MULTI-EYE IMAGE CAPTURE SECTION HAS RGBIR SENSORS AS SOLID-STATE IMAGE CAPTURE DEVICES, & SINGLE-EYE IMAGE CAPTURE SECTION HAS RGB SENSOR AS SOLID-STATE IMAGE CAPTURE DEVICE

| INSERTION/REMOVAL OF INFRARED CUT FILTER OF SINGLE-EYE IMAGE CAPTURE SECTION | USE/NON-USE OF ILLUMINATION SECTION | EXPOSURE LEVEL ADJUSTMENT FOR MULTI-EYE IMAGE CAPTURE SECTION ACCORDING TO IMAGE CAPTURE DIRECTION OF SINGLE-EYE IMAGE CAPTURE SECTION |
|---|---|---|
| INSERT | NOT USE | NOT ADJUST |
| INSERT | USE | ADJUST |
| REMOVE | USE | ADJUST |

FIG. 11B

CASE WHERE MULTI-EYE IMAGE CAPTURE SECTION HAS RGB SENSORS AS SOLID-STATE IMAGE CAPTURE DEVICES, & SINGLE-EYE IMAGE CAPTURE SECTION HAS RGBIR SENSOR AS SOLID-STATE IMAGE CAPTURE DEVICE

| INSERTION/REMOVAL OF INFRARED CUT FILTERS OF MULTI-EYE IMAGE CAPTURE SECTION | USE/NON-USE OF ILLUMINATION SECTION | EXPOSURE LEVEL ADJUSTMENT FOR MULTI-EYE IMAGE CAPTURE SECTION ACCORDING TO IMAGE CAPTURE DIRECTION OF SINGLE-EYE IMAGE CAPTURE SECTION |
|---|---|---|
| INSERT | NOT USE | NOT ADJUST |
| INSERT | USE | NOT ADJUST |
| REMOVE | NOT USE | NOT ADJUST |
| REMOVE | USE | ADJUST |

FIG. 11C

CASE WHERE MULTI-EYE IMAGE CAPTURE SECTION & SINGLE-EYE IMAGE CAPTURE SECTION BOTH HAVE RGBIR SENSORS AS SOLID-STATE IMAGE CAPTURE DEVICES

| USE/NON-USE OF ILLUMINATION SECTION | EXPOSURE LEVEL ADJUSTMENT FOR MULTI-EYE IMAGE CAPTURE SECTION ACCORDING TO IMAGE CAPTURE DIRECTION OF SINGLE-EYE IMAGE CAPTURE SECTION |
|---|---|
| NOT USE | NOT ADJUST |
| USE | ADJUST |

IMAGE CAPTURE APPARATUS HAVING ILLUMINATION SECTION, MONITORING SYSTEM INCLUDING IMAGE CAPTURE APPARATUS, METHOD OF CONTROLLING IMAGE CAPTURE APPARATUS, AND STORAGE MEDIUM

BACKGROUND OF THE INVENTION

Field of the Invention

The present invention relates to an image capture apparatus having an illumination section, a monitoring system including the image capture apparatus, a method of controlling the image capture apparatus, and a storage medium, and more particularly to an image capture apparatus having an illumination section, which is used e.g. for surveillance during the night, a monitoring system including the image capture apparatus, a method of controlling the image capture apparatus, and a storage medium.

Description of the Related Art

To acquire a clear subject image even under a low-illumination environment, such as during nighttime, there has been proposed an image capture apparatus that illuminates a subject using an infrared LED light source (see e.g. Japanese Laid-Open Patent Publication (Kokai) No. 2013-41282).

However, even in a case where a perfect diffuse light source is used for illumination, the illumination intensity at an illuminated flat surface is gradually reduced toward the periphery of the surface, compared with an illumination intensity at an area directly under the light source, according to the cosine fourth law, and hence it is difficult to illuminate a subject at a uniform illumination intensity. It is much more difficult to illuminate a subject at a uniform illumination intensity, in a case where an LED light source having a light distribution with high directivity is used for illumination, as disclosed in Japanese Laid-Open Patent Publication (Kokai) No. 2013-41282.

In a case where it is impossible to illuminate a subject at a uniform illumination intensity as above, a subject within an image capture angle suffers from an uneven luminance distribution, which degrades the quality of a captured image. Particularly, in a case where the unevenness in luminance distribution is large, overexposure or underexposure is liable to occur in a captured image.

SUMMARY OF THE INVENTION

The present invention provides an image capture apparatus that is capable of improving the quality of an image captured using illumination, a monitoring system including the image capture apparatus, a method of controlling the image capture apparatus, and a storage medium.

In a first aspect of the present invention, there is provided image capture apparatus comprising a multi-eye image capture section having a plurality of image capture sections that capture images in different image capture ranges partially overlapping with each other so as to generate a wide-angle image, a single-eye image capture section that is capable of capturing an image in part of the image capture ranges of the multi-eye image capture section and is capable of changing an image capture direction, an illumination section that has a peak of illumination intensity within an image capture range of the single-eye image capture section, at least one memory that stores a set of instructions, and at least one processor that executes the instructions, the instructions, when executed, causing the image capture apparatus to perform operations comprising controlling, when performing image capture using the illumination section, the exposure level of a first image capture section of the plurality of image capture sections of the multi-eye image capture section, which has an image capture range overlapping with the image capture range of the single-eye image capture section, such that the exposure level of the first image capture section becomes lower than the exposure level of a second image capture section having an image capture range not overlapping with the image capture range of the single-eye image capture section.

In a second aspect of the present invention, there is provided a monitoring system including an image capture apparatus and an information processing apparatus, wherein the image capture apparatus comprises a multi-eye image capture section having a plurality of image capture sections that capture images in different image capture ranges partially overlapping with each other so as to generate a wide-angle image, a single-eye image capture section that is capable of capturing an image in part of the image capture ranges of the multi-eye image capture section and is capable of changing an image capture direction, an illumination section that has a peak of illumination intensity within an image capture range of the single-eye image capture section, at least one memory that stores a set of instructions, and at least one processor that executes the instructions, the instructions, when executed, causing the image capture apparatus to perform operations comprising controlling, when performing image capture using the illumination section, the exposure level of a first image capture section of the plurality of image capture sections of the multi-eye image capture section, which has an image capture range overlapping with the image capture range of the single-eye image capture section, such that the exposure level of the first image capture section becomes lower than the exposure level of a second image capture section having an image capture range not overlapping with the image capture range of the single-eye image capture section, and wherein the information processing apparatus displays the wide-angle image and an image captured by the single-eye image capture section, and transmits an instruction for controlling the image capture apparatus to the image capture apparatus.

In a third aspect of the present invention, there is provided a method of controlling an image capture apparatus including a multi-eye image capture section having a plurality of image capture sections that capture images in different image capture ranges partially overlapping with each other so as to generate a wide-angle image, a single-eye image capture section that is capable of capturing an image in part of the image capture ranges of the multi-eye image capture section and is capable of changing an image capture direction, and an illumination section that has a peak of illumination intensity within an image capture range of the single-eye image capture section, the method comprising controlling, when performing image capture using the illumination section, the exposure level of a first image capture section of the plurality of image capture sections of the multi-eye image capture section, which has an image capture range overlapping with the image capture range of the single-eye image capture section, such that the exposure level of the first image capture section becomes lower than the exposure level of a second image capture section having an image capture range not overlapping with the image capture range of the single-eye image capture section.

In a fourth aspect of the present invention, there is provided a non-transitory computer-readable storage medium storing a computer-executable program for executing a method of controlling an image capture apparatus including a multi-eye image capture section having a plurality of image capture sections that capture images in different image capture ranges partially overlapping with each other so as to generate a wide-angle image, a single-eye image capture section that is capable of capturing an image in part of the image capture ranges of the multi-eye image capture section and is capable of changing an image capture direction, and an illumination section that has a peak of illumination intensity within an image capture range of the single-eye image capture section, wherein the method comprises controlling, when performing image capture using the illumination section, the exposure level of a first image capture section of the plurality of image capture sections of the multi-eye image capture section, which has an image capture range overlapping with the image capture range of the single-eye image capture section, such that the exposure level of the first image capture section becomes lower than the exposure level of a second image capture section having an image capture range not overlapping with the image capture range of the single-eye image capture section.

According to the present invention, it is possible to improve the quality of an image captured using illumination.

Further features of the present invention will become apparent from the following description of exemplary embodiments (with reference to the attached drawings).

BRIEF DESCRIPTION OF THE DRAWINGS

FIGS. 3A to 3C are diagrams useful in explaining exposure level control performed by the image capture apparatus, for controlling the exposure levels of the multi-eye image capture section, in a case where the image capture range of the single-eye image capture section overlaps with image capture ranges of two image capture sections of the multi-eye image capture section and the image capture direction of one of the two image capture sections is closer to the image capture direction of the single-eye image capture section than that of the other is.

FIGS. 5A to 5C are diagrams useful in explaining exposure level control performed by the image capture apparatus according to the second embodiment, for controlling the exposure levels of a multi-eye image capture section in a case where the image capture range of a single-eye image capture section, appearing in FIG. 4, overlaps only with the image capture range of one of image capture sections of the multi-eye image capture section.

FIGS. 6A to 6C are diagrams useful in explaining exposure level control performed by the image capture apparatus, for controlling the exposure levels of the multi-eye image capture section in a case where an image capture angle of the single-eye image capture section is wider than that in the case shown in FIGS. 5A to 5C.

FIGS. 7A to 7C are diagrams useful in explaining exposure level control performed by an image capture apparatus according to a third embodiment, for controlling the exposure levels of a multi-eye image capture section in a case where an image capture range of a single-eye image capture section overlaps only with an image capture range of one of image capture sections of a multi-eye image capture section.

FIG. 9 is a table showing a relationship between a position of a focus lens and a focal length, which is acquired by an image capture apparatus according to a fourth embodiment.

FIG. 10 is a table showing how the exposure level control of a multi-eye image capture section of an image capture apparatus according to a fifth embodiment is switched based on the image capture direction of a single-eye image capture section of the image capture apparatus, in a case where the multi-eye image capture section and the single-eye image capture section are each equipped with a mechanism for inserting an infrared cut filter therein or removing the same therefrom.

FIGS. 11A to 11C are tables each showing how the exposure level control of the multi-eye image capture section is switched based on the image capture direction of the single-eye image capture section, in a case where an RGBIR sensor is further used in one or both of the multi-eye image capture section and the single-eye image capture sections.

DESCRIPTION OF THE EMBODIMENTS

The present invention will now be described in detail below with reference to the accompanying drawings showing embodiments thereof.

Figure 1A:
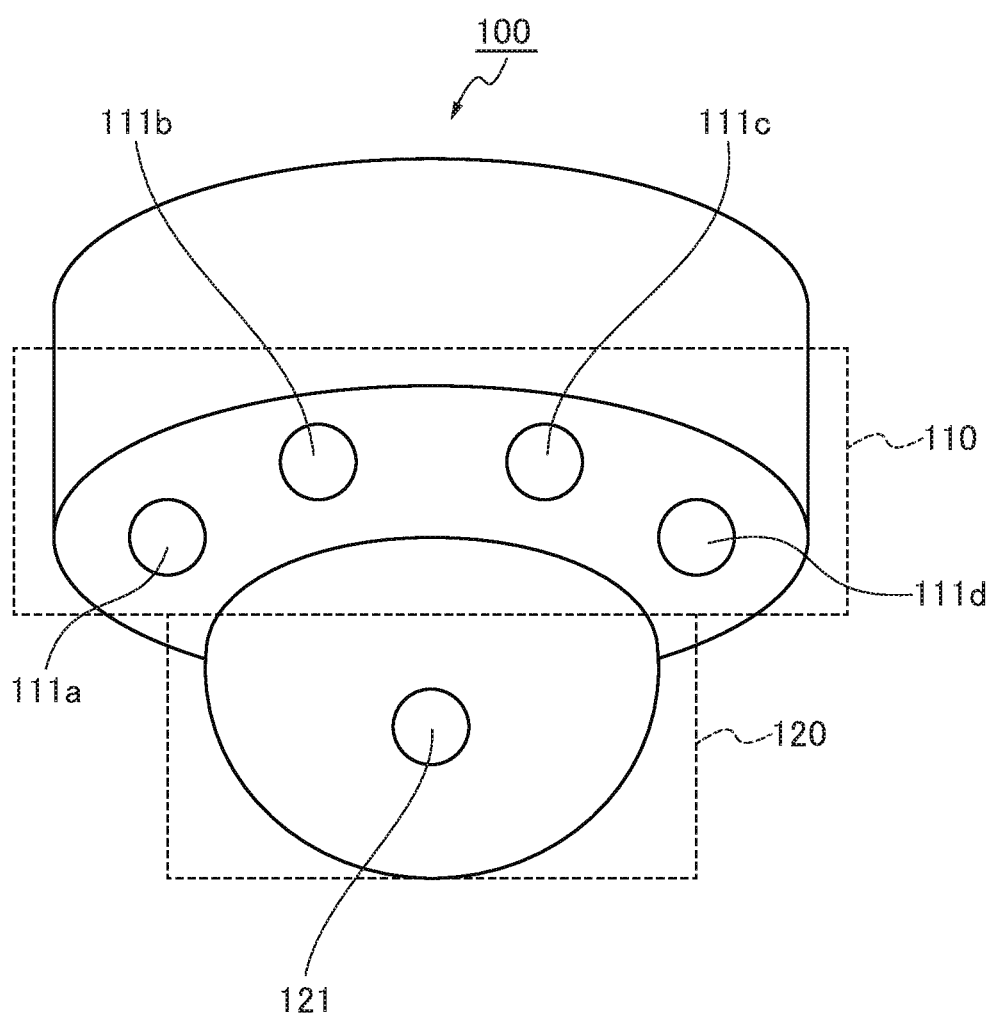
FIG. 1A is a schematic view of an image capture apparatus according to a first embodiment, as viewed obliquely.

A description will be given of an image capture apparatus according to a first embodiment with reference to FIGS. 1A to 1C. FIG. 1A is a schematic view of the image capture apparatus, denoted by reference numeral 100, as viewed obliquely, FIG. 1B is a view of the image capture apparatus 100, as viewed from above, i.e. from a +Z axis based on a XYZ coordinate system indicated therein, and FIG. 1C is an internal function block diagram of the image capture apparatus 100.

Figure 1B:
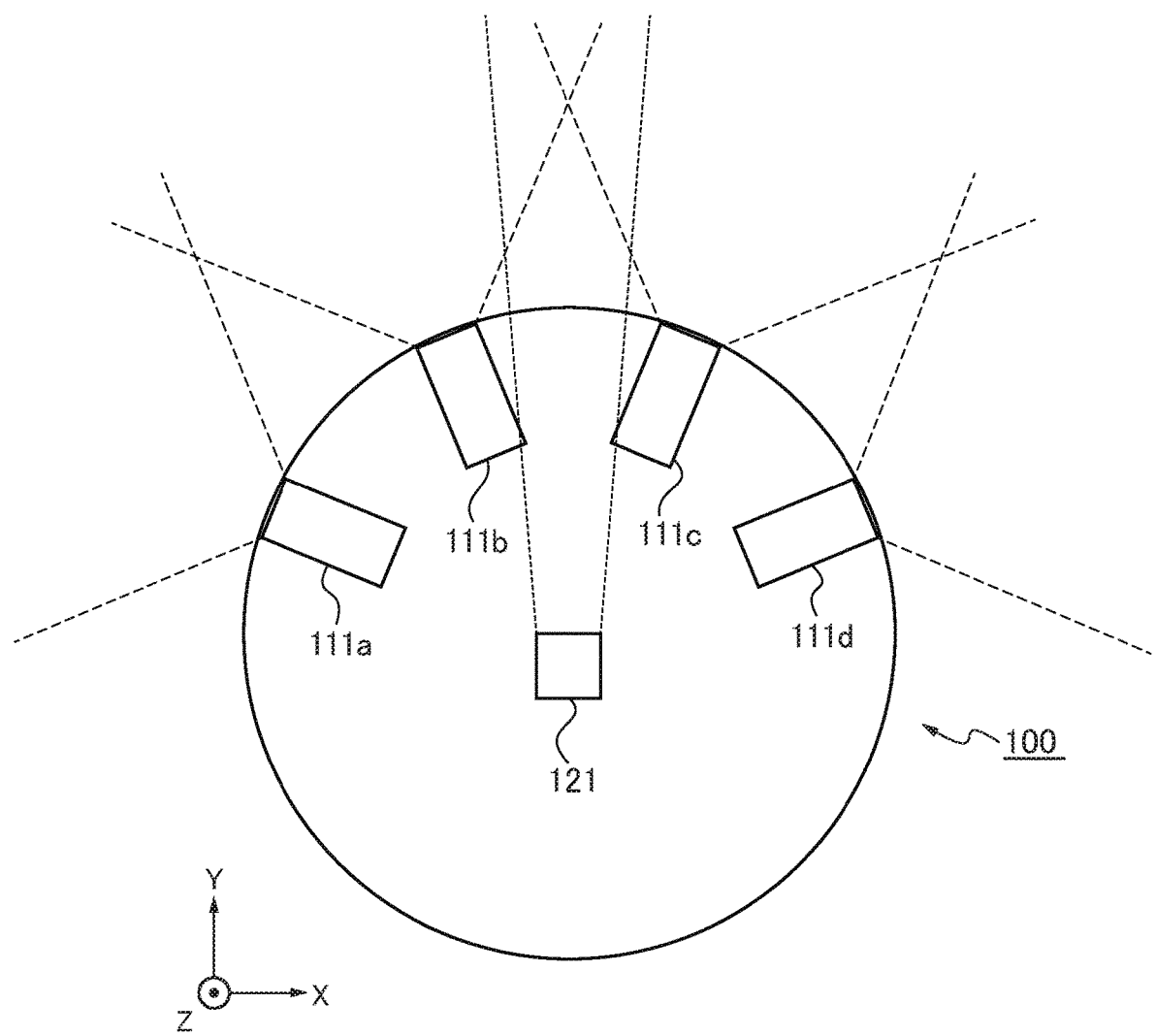
FIG. 1B is a view of the image capture apparatus shown in FIG. 1A, as viewed from above.
Figure 1C:
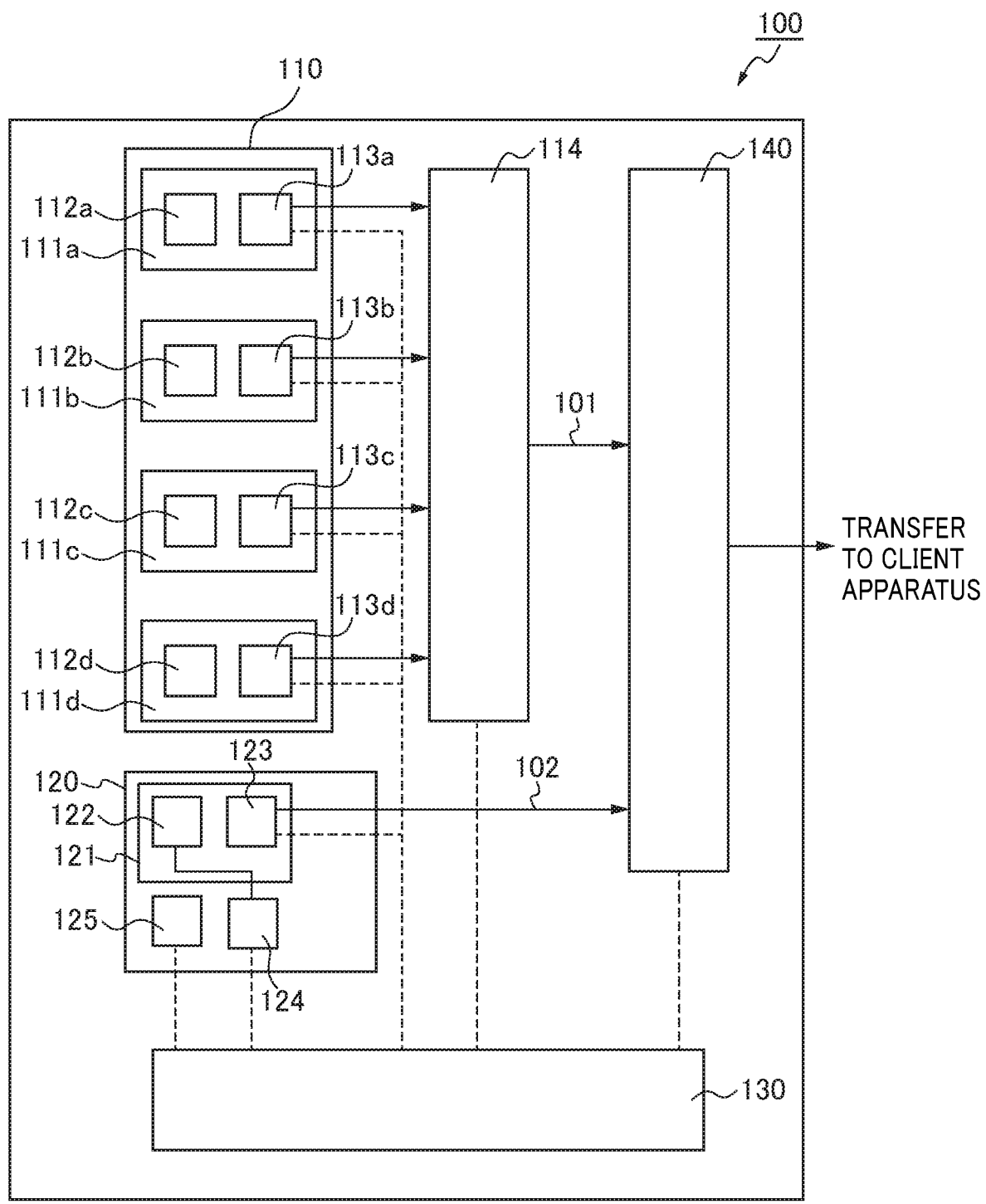
FIG. 1C is an internal function block diagram of the image capture apparatus shown in FIG. 1A.

As shown in FIGS. 1A to 1C, the image capture apparatus 100 includes a multi-eye image capture section 110, a synthesis processor 114, a single-eye image capture section 120, a controller 130, and a transfer section 140.

The multi-eye image capture section 110 includes a plurality of image capture sections 111a to 111d that capture images in different image capture ranges, which partially overlap, so as to generate a wide-angle image 101.

The single-eye image capture section 120 includes a single image capture section 121 that captures an image in part of the whole image capture range covered by the multi-eye image capture section 110 so as to acquire a detailed image 102.

The controller 130 controls the overall operation of the image capture apparatus 100, including the operations of the multi-eye image capture section 110 and the single-eye image capture section 120.

The transfer section 140 transfers the wide-angle image 101 and the detailed image 102 to an external client apparatus. More specifically, the transfer section 140 is connected to the external client apparatus e.g. via a wired or wireless network, and switches an image to be transferred to one of the wide-angle image 101 and the detailed image 102 by a switch, not shown, within the transfer section 140. With this, the wide-angle image 101 and the detailed image 102 are sequentially transferred from the transfer section 140 to the external client apparatus via the same network.

The external client apparatus transmits a command for controlling the image capture apparatus 100 to the transfer section 140 via the network. After that, upon transfer of the command from the transfer section 140 to the controller 130, the controller 130 performs processing corresponding to the command in the image capture apparatus 100, and transmits a result of the processing to the client apparatus as a response to the command. The client apparatus is an external apparatus, such as a PC, and the network is formed by a wired LAN, a wireless LAN, or the like. Further, power may be supplied to the image capture apparatus 100 via the network.

That is, in the present embodiment, a monitoring system using the image capture apparatus according to the present invention is comprised of the image capture apparatus 100 and an external client apparatus (information processing apparatus) connected to the image capture apparatus 100 via a network.

Next, the multi-eye image capture section 110 which is a multi-lens wide-angle camera will be described.

The multi-eye image capture section 110 includes the plurality of image capture sections 111a to 111d, which are arranged such that the image capture ranges partially overlap, and generates the wide-angle image 101 using the synthesis processor 114 that synthesizes a plurality of images acquired by the image capture sections 111a to 111d. More specifically, the wide-angle image 101 is generated by applying a technique of so-called pattern matching in which a correlation coefficient is determined while shifting an overlapping part of images acquired by adjacent ones (e.g. the image capture sections 111a and 111b) of a plurality of image capture sections, to thereby determine positional shift amounts between the plurality of images. Note that although in the present embodiment, the wide-angle image 101 is generated by the synthesis processor 114, this is not limitative. For example, the transfer section 114 (output unit) may output images acquired by the image capture sections 111a to 111d to an external client apparatus, and the external client apparatus may generate the wide-angle image 101 based on the images acquired by the image capture sections 111a to 111d.

The plurality of image capture sections 111a to 111d include image forming optical systems 112a to 112d and solid-state image capture devices 113a to 113d, respectively. The image capture sections 111a to 111d acquire images by causing subject images to be formed on the solid-state image capture devices 113a to 113d via the image forming optical systems 112a to 112d, respectively Driving and signal reading of each of the solid-state image capture devices 113a to 113d are controlled by the controller 130. That is, the controller 130 controls the exposure level of each of the image capture sections 111a to 111d of the multi-eye image capture section 110 by controlling a time period over which charges are accumulated in pixels of the solid-state image capture devices 113a to 113d. Details of this exposure level control will be described hereinafter. Note that the exposure level control may be performed by controlling exposure parameters, such as a digital gain, an aperture value, and the density of an ND filter or the like, which are associated with components for adjusting the light amount and exposure, other than the solid-state image capture devices 113a to 113d.

Next, the single-eye image capture section 120 which is a single-lens camera will be described.

The single-eye image capture section 120 includes the single image capture section 121 formed by an image forming optical system 122 and a solid-state image capture device 123, a drive mechanism 124 which can change an image capture direction, and an illumination section 125. Similar to the multi-eye image capture section 110, driving and signal reading of the solid-state image capture device 123 are controlled by the controller 130.

The drive mechanism 124 includes a motor and a gear, and rotates the single-eye image capture section 120 as a single unit about a specific rotational axis by controlling electric power for driving the motor. This rotation of the single-eye image capture section 120, performed by the drive mechanism 124, is controlled by the controller 130. Note that the drive mechanism 124 may be configured to have a plurality of motors, whereby the single-eye image capture section 120 may be rotated about a plurality of rotational axes.

The illumination section 125 is an LED formed by a compound semiconductor material, such as InGaN and AlGaAs, or an organic semiconductor, and performs illumination in an image capture angle of the single-eye image capture section 120. More specifically, the illumination section 125 has a peak of illumination intensity within an image capture range of the single-eye image capture section 120. The illumination light irradiated from the illumination section 125 is set to a wavelength to which the solid-state image capture devices 113a to 113d and 123 of the image capture sections 111a to 111d and 121 have sensitivity. For example, in a case where the solid-state image capture devices 113a to 113d and 123 are each formed using a silicon-based component, the peak wavelength of the illumination light is only required to be set to a value which is not smaller than 300 nm and not larger than 1100 nm.

When image capture is performed using the illumination section 125, the image capture apparatus 100 controls the exposure levels of the plurality of image capture sections 111a to 111d of the multi-eye image capture section 110 based on an image capture direction of the single-eye image capture section 120. More specifically, the exposure level(s) of any of the plurality of image capture sections 111a to 111d forming the multi-eye image capture section 110, which has an image capture range at least partially overlapping with the image capture range of the single-eye image capture section 120, is/are controlled to a value or values lower than the exposure level(s) of image capture sections each having an image capture range not overlapping with the image capture range of the single-eye image capture section 120. For example, in a case shown in FIG. 1B, the exposure levels of the ones 111b and 111c of the plurality of image capture sections 111a to 111d forming the multi-eye image capture section 110 are controlled to values lower than the exposure levels of the others 111a and 111d, by this exposure level control.

With this configuration, when image capture is performed using the illumination section 125, it is possible to reduce luminance unevenness of the wide-angle image 101, caused by light distribution of illumination.

The following description is given of the exposure level control for the multi-eye image capture section 110 in a case where the image capture range of the single-eye image capture section 120 overlaps only with the image capture range of one of the image capture sections of the multi-eye image capture section 110, and does not overlap with the image capture ranges of the other image capture sections, in comparison with a conventional example.

Figures 2B, 2C, 2D:
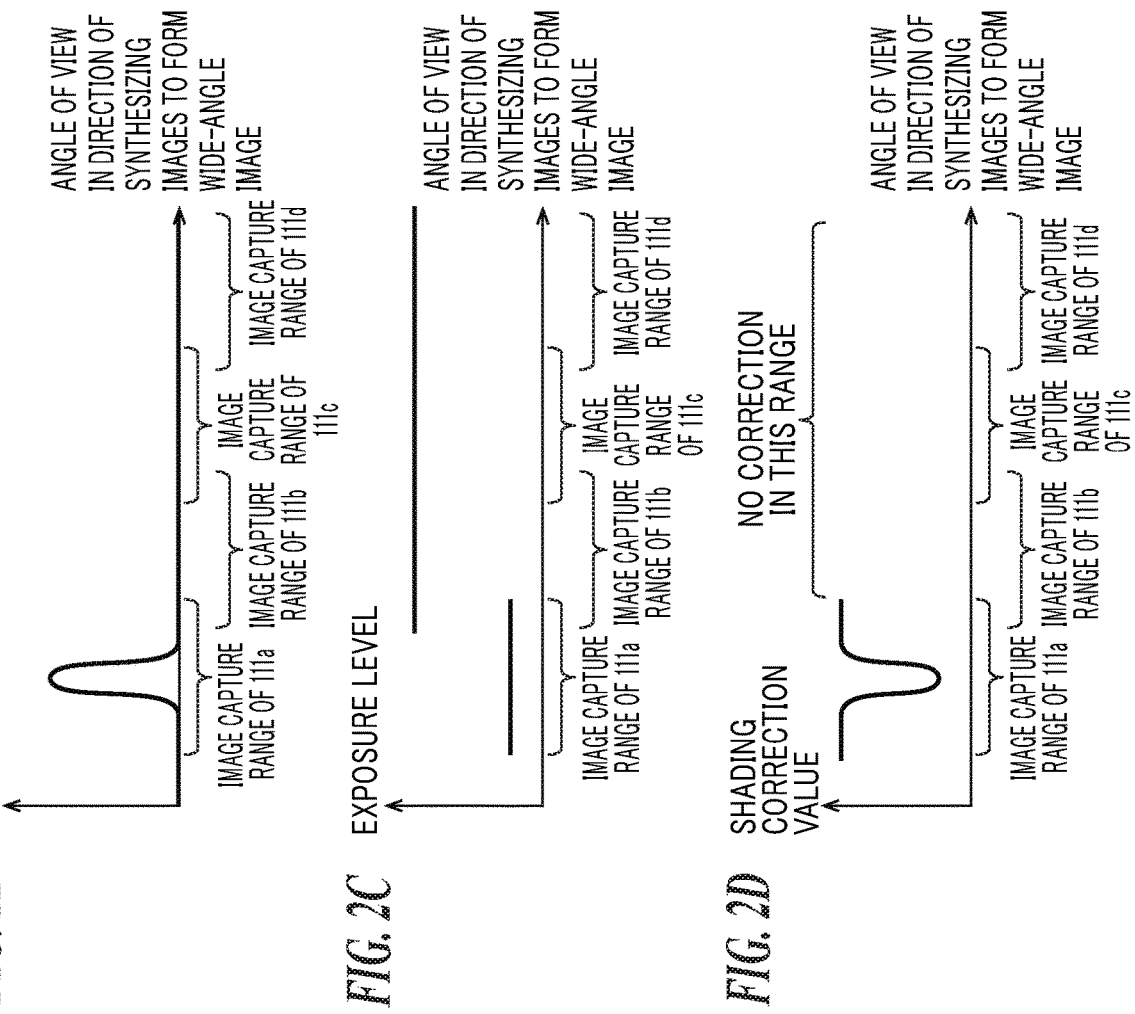
FIGS. 2A to 2D are diagrams useful in explaining exposure level control performed by the image capture apparatus, for controlling the exposure levels of a multi-eye image capture section, in a case where an image capture range of a single-eye image capture section, appearing FIGS. 1A to 1C, overlaps only with an image capture range of one of image capture sections of the multi-eye image capture section, appearing in FIGS. 1A to 1C.
Figure 2A:
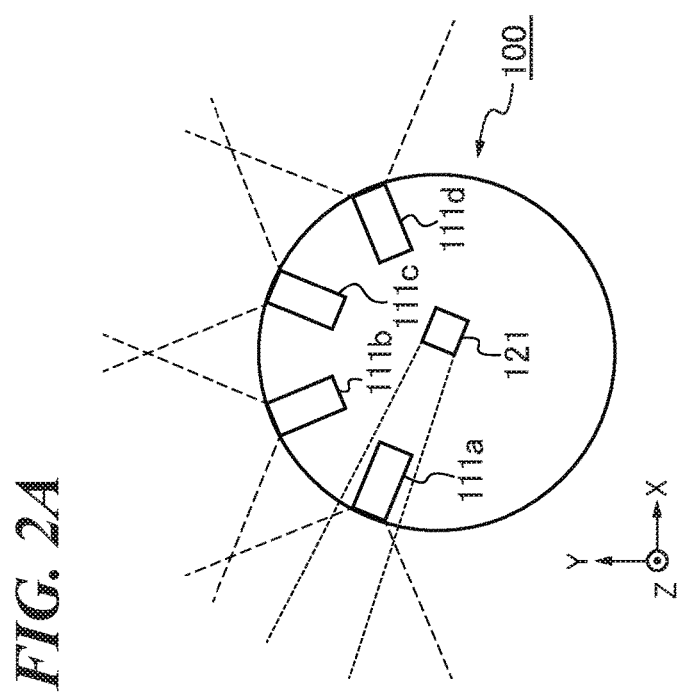

FIG. 2A shows a state of the image capture apparatus 100 in which the image capture range of the single-eye image capture section 120 overlaps only with the image capture range of the image capture section 111a of the multi-eye image capture section 110. FIG. 2B shows illumination intensity distribution by the illumination section 125 in the state shown in FIG. 2A, and FIG. 2C shows exposure levels set to the image capture sections 111a to 111d, respectively, for exposure level adjustment to the illumination intensity distribution shown in FIG. 2B. Here, the exposure level refers to a so-called EV (Exposure Value). That is, when the EV is increased by 1, the luminance of the image is made twice as high as before. FIG. 2D shows a shading correction value set in a case where not only exposure level adjustment shown in FIG. 2C, but also shading adjustment is performed within the image capture range of the image capture section 111a so as to make flat the pixel signal levels of the image capture sections 111a to 111d. This shading adjustment will be described hereinafter.

As mentioned hereinabove, the illumination section 125 has a peak of its illumination intensity in a direction in which the single-eye image capture section 120 is oriented. Therefore, in the case of the illumination intensity distribution shown in FIG. 2B, assuming that all of the image capture sections 111a to 111d of the multi-eye image capture section 110 are equal in exposure level, only an image acquired by the image capture section 111a having the image capture range overlapping with the image capture range of the single-eye image capture section 120 becomes brighter than images acquired by the other image capture sections 111b to 111d. As a result, luminance unevenness is caused in the wide-angle image 101 generated by synthesizing the images captured by the image capture sections 111a to 111d.

In view of this, if the exposure level of the image capture section 111a is made lower than the exposure level of the image capture sections 111b to 111d, a difference in brightness between the image acquired by the image capture section 111a and the images acquired by the image capture sections 111b to 111d is reduced. As a result, it is possible to reduce luminance unevenness caused in the wide-angle image 101 generated by synthesizing the images captured by the image capture sections 111a to 111d. Therefore, it is possible to improve the quality of the wide-angle image 101.

Note that the exposure levels of the image capture sections 111a to 111d may be varied within the image capture angle of the single-eye image capture section 120. That is, in a case where the image capture range of the single-eye image capture section 120 overlaps with the image capture ranges of a plurality of image capture sections of the multi-eye image capture section 110, the exposure level may be controlled to different values between the image capture sections. More specifically, it is preferable that as the image capture range of an image capture section is closer to the image capture direction of the single-eye image capture section 120, the exposure level set to the image capture section is controlled to a lower value. Here, the term "image capture direction of the single-eye image capture section 120" refers to the direction of the optical axis of the image forming optical system 122.

The following description is given, with reference to FIGS. 3A to 3C, of the exposure level control for the image capture apparatus 100, for controlling the exposure levels of the multi-eye image capture section 110 in a case where the image capture range of the single-eye image capture section 120 overlaps with the image capture ranges of two of the image capture sections of the multi-eye image capture section 110, and the image capture range of one of the two image capture sections is closer to the image capture direction of the single-eye image capture section 120 than that of the other is.

FIG. 3A shows a state of the image capture apparatus 100 in which the image capture range of the single-eye image capture section 120 overlaps with the image capture ranges of the image capture sections 111a and 111b of the multi-eye image capture section 110, and the image capture range of the image capture section 111a is closer to the image capture direction of the single-eye image capture section 120 than that of the image capture section 111b is. FIG. 3B shows illumination intensity distribution by the illumination section 125, occurring in the state shown in FIG. 3A, and FIG. 3C shows the exposure levels set to the image capture sections 111a to 111d in this state.

As is apparent from the illumination intensity distribution in FIG. 3B, when a comparison is made between illumination intensities associated with the image capture sections 111a and 111b, the illumination intensity is higher in the image capture range of the image capture section 111a closer to the image capture direction of the single-eye image capture section 120 than in the image capture range of the image capture section 111b. Therefore, it is possible to reduce luminance unevenness of the wide-angle image 101 generated by synthesis by making the exposure level of the image capture section 111a lower than that of the image capture section 111b.

Further, in a case where spread of the illumination intensity distribution by the illumination section 125 is wider than the image capture range of the single-eye image capture section 120, the exposure level control may be also performed for any of the image capture sections 111a to 111d of the multi-eye image capture section 110, outside the image capture range of the single-eye image capture section 120. More specifically, this applies to the image capture section 111c in FIG. 3B in which although the image capture range thereof does not overlap with the image capture range of the single-eye image capture section 120, the illumination intensity distribution by the illumination section 125 spreads to part of this image capture range. In this case, it is preferable to control the respective exposure levels of the image capture sections 111c and 111d to different values. More specifically, as shown in FIG. 3C, it is preferable to control the exposure level of each image capture section such that as the image capture range thereof is closer to the image capture direction of the single-eye image capture section 120, the exposure level set to the image capture section is made lower.

On the other hand, there is a case where spread of the illumination intensity distribution by the illumination section 125 is narrower than the image capture range of the single-eye image capture section 120. In this case, if there are a plurality of image capture sections of the multi-eye image capture section 110 of which respective image capture ranges do not overlap with the image capture range of the single-eye image capture section 120 (the image capture sections 111b to 111d in FIG. 2B), it is preferable to set the exposure levels of these image capture sections to a common value, as shown in FIG. 2C.

The above description is given of the method of reducing luminance unevenness of the wide-angle image 101 by adjusting the exposure level of each of the plurality of image capture sections 111a to 111d of the multi-eye image capture section 110. In addition to this method, it is more preferable to reduce luminance unevenness within the image capture ranges (image capture angle) of the image capture sections 111a to 111d. More specifically, it is only required to perform so-called shading correction (adjustment) in which luminance unevenness is corrected in the image capture range of each of the plurality of the image capture sections 111a to 111d of the multi-eye image capture section 110.

It is only required that coefficient of shading correction is determined by measuring illumination intensity distribution by the illumination section 125 in advance. More specifically, it is possible to measure the illumination intensity distribution from images acquired by the image capture sections 111a to 111d when only the illumination section 125 is lighted to a subject having uniform reflectance distribution.

In a case where the peak of the illumination intensity from the illumination section 125 coincides with the image capture direction of the single-eye image capture section 120, shading correction is performed for any of the image capture sections 111a to 111d of the multi-eye image capture section 110, which has an image capture range at least partially overlapping with the image capture range of the single-eye image capture section 120. More specifically, as shown in FIG. 2D, it is only required that shading correction is performed for the image capture ranges of the image capture sections 111a to 111d of the multi-eye image capture section 110 such that the pixel signal level is made higher as the image capture range is farther from the image capture direction of the single-eye image capture section 120.

FIG. 1C shows the case where only the single-eye image capture section 120 includes the illumination section 125, but the multi-eye image capture section 110 does not include an illumination section. However, each of the image capture sections 111a to 111d of the multi-eye image capture section 110 may include an illumination section having a peak of illumination intensity in its image capture range. In this case, an SN ratio of the wide-angle image 101 in a low-illumination environment is improved, and hence this configuration is further preferable.

Further, although FIGS. 1B and 1C show the case where the multi-eye image capture section 110 includes the four image capture sections 111a to 111d, the number of image capture sections included in the multi-eye image capture section 110 is not limited to four. For example, the multi-eye image capture section 110 may include two or three, or five or more image capture sections. Further, the image capture ranges of the multi-eye image capture section 110 are not necessarily required to be the ranges indicated by broken lines in FIG. 1B, but it may cover the whole circumference of 360 degrees.

Further, in the present embodiment, the transfer section 140 sequentially transfers images to the external client apparatus via the same network by switching the image to be transferred to one of the wide-angle image 101 and the detailed image 102 by the switch, not shown, the transfer method is not limited to this. For example, the image capture apparatus 100 may have a transfer section dedicated to the wide-angle image 101 and a transfer section dedicated to the detailed image 102, and transfer the wide-angle image 101 and the detailed image 102 to the external client apparatus via different networks, respectively. However, it is more preferable to distribute images via the same network because it is easy to grasp correspondence between the wide-angle image 101 and the detailed image 102.

Further, the present embodiment shows an example in which the transfer section 140 transfers the wide-angle image 101 and the detailed image 102 to the external client apparatus, and receives a command from the external client apparatus, and the controller 130 controls the operation of the image capture apparatus 100 according to the received command. However, this is not limitative. For example, the image capture apparatus 100 may include, in place of the transfer section 140, a memory for storing the wide-angle image 101 and the detailed image 102, a viewer for displaying the wide-angle image 101 and the detailed image 102, stored in the memory, and an interface for receiving a command from a user. Alternatively, the image capture apparatus 100 shown in FIG. 1C may additionally include the above-mentioned memory, viewer, and interface.

Although as the method of controlling the exposure levels of the plurality of image capture sections 111a to 111d of the multi-eye image capture section 110, the method of controlling the time period of accumulating charges in the pixels of the solid-state image capture devices 113a to 113d is described by way of example, it is not necessarily required to use this method.

For example, in a case where the image capture apparatus 100 includes a gain controller which controls signal amplification coefficients (gains) of the solid-state image capture devices 113a to 113d, the exposure level may be controlled by controlling the signal amplification coefficients. Note that in a case where the solid-state image capture devices 113a to 113d each have an analog-to-digital conversion function therein, it is preferable that the gain controller controls the signal amplification coefficients before analog-to-digital conversion (analog gains). Further, in a case where the image forming optical systems 112a to 112d of the plurality of image capture sections 111a to 111d each include an aperture control mechanism, the controller 130 may control the exposure levels of the plurality of image capture sections 111a to 111d by controlling each aperture control mechanism. Further, in a case where the image forming optical systems 112a to 112d each include a light absorbing filter and a mechanism for inserting and removing the light absorbing filter, the controller 130 may control the exposure level by controlling insertion and removal of the light absorbing filter using the mechanism. Alternatively, in a case where the image forming optical systems 112a to 112d each include a variable transmittance filter formed by a liquid crystal or the like as the light absorbing filter, the controller 130 may control the exposure level by controlling a voltage applied to the variable transmittance filter. Further, the plurality of exposure level control methods described above may be used in combination.

Further, in a case where the illumination intensity from the illumination section 125 is high, in addition to the control of charge accumulation time period, a frame rate of each of the image capture sections 111a to 111d of the multi-eye image capture section 110 may be changed. The charge accumulation time period of the solid-state image capture devices 113a to 113d can be set to be longer as the frame rate is lower, and hence it is possible to increase the exposure level of the image capture sections 111a to 111d. That is, the controller 130 controls the image capture sections 111a to 111d of the multi-eye image capture section 110 such that the frame rate of one(s) which has/have the image capture range not overlapping with the image capture range of the single-eye image capture section 120 is/are made lower than that of an image capture section having an image capture range at least partially overlapping with the image capture range of the single-eye image capture section 120. This makes it possible to further reduce luminance unevenness of the wide-angle image 101.

Next, a description will be given of a second embodiment. Component elements of the present embodiment are denoted by reference numerals of 200s. Further, the same component elements as those of the first embodiment are denoted by reference numerals which are changed from 100s to 200s, and redundant description thereof is omitted.

An image capture apparatus 200 according to the second embodiment differs from the image capture apparatus 100 according to the first embodiment in the construction of a single-eye image capture section 220.

Figure 4:
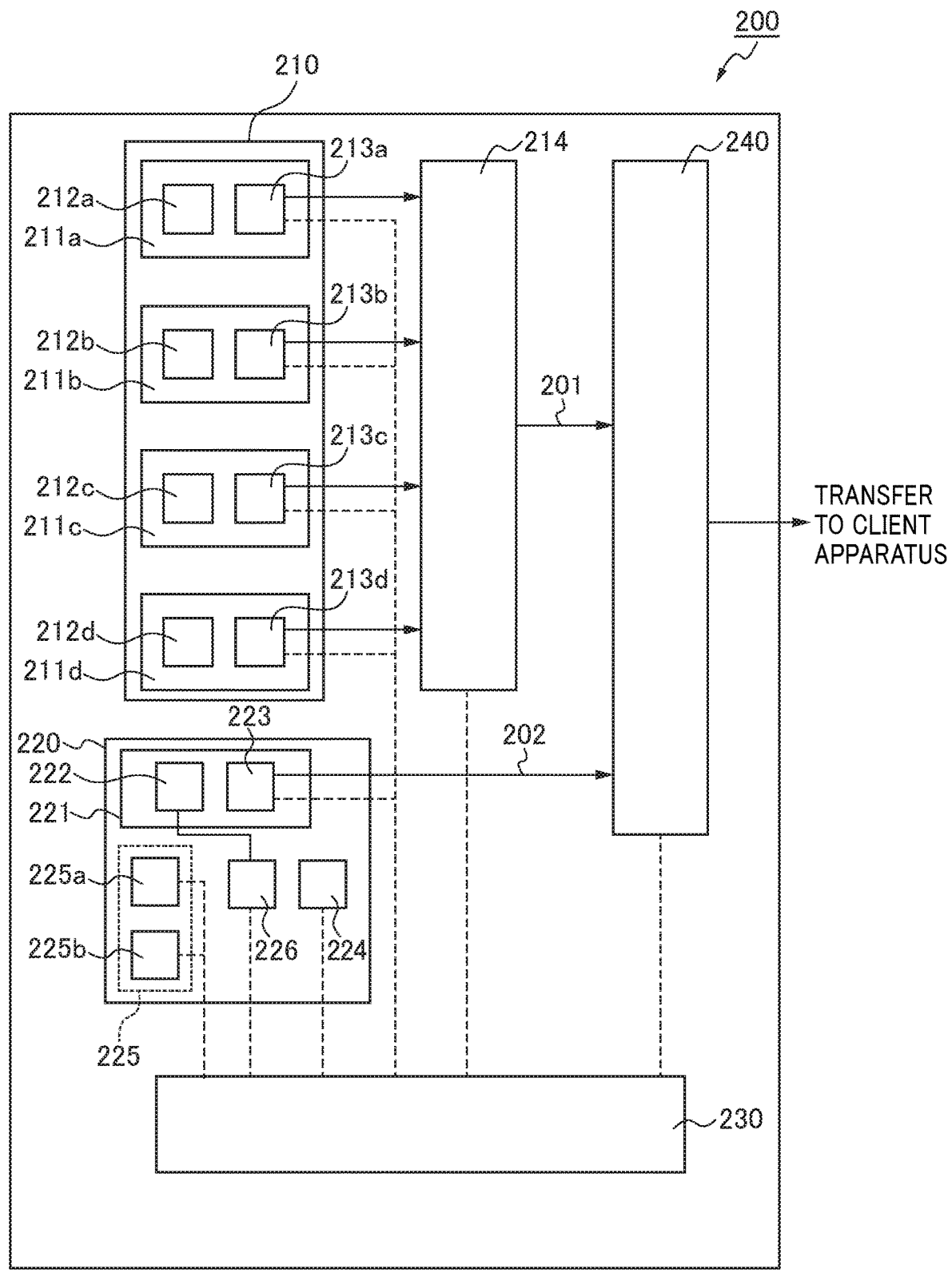
FIG. 4 is an internal function block diagram of an image capture apparatus according to a second embodiment.

FIG. 4 is an internal function block diagram of the image capture apparatus 200 according to the second embodiment.

Referring to FIG. 4, the single-eye image capture section 220 of the image capture apparatus 200 includes not only the same component elements as those of the single-eye image capture section 120, but also a zoom control mechanism 226 that is capable of changing an image capture angle of an image capture section 221. The zoom control mechanism 226 includes a motor and a gear, and the configuration may be such that a zoom ratio is changed by moving one or some of the lenses of an image forming optical system 222 of the single-eye image capture section 220 in the optical axis direction.

Further, an illumination section 225 of the single-eye image capture section 220 includes a narrow-angle illumination section 225a having a narrow light distribution angle and a wide-angle illumination section 225b having a wide light distribution angle, and selectively uses one of the narrow-angle illumination section 225a and the wide-angle illumination section 225b according to an image capture angle of the single-eye image capture section 220. More specifically, in a case where the image capture angle of the single-eye image capture section 220 is a narrow angle smaller than a predetermined angle, the narrow-angle illumination section 225a is used for illumination for image capture. On the other hand, in a case where the image capture angle of the single-eye image capture section 220 is a wide angle not smaller than the predetermined angle, the wide-angle illumination section 225b is used for illumination for image capture.

As described above, the narrow-angle illumination section 225a or the wide-angle illumination section 225b, which are different in light distribution angle, is selectively used according to the image capture angle of the single-eye image capture section 220, whereby it is possible to efficiently illuminate a subject an image of which is being captured using the single-eye image capture section 220. As a result, it is possible to improve the image quality of a detailed image 202. The following description is given of this control.

In general, in a case where image capture is performed using an image capture apparatus that is capable of changing the image capture angle, as a distance from the image capture apparatus to a subject an image of which is captured is larger, it is necessary to capture an image of the subject in an enlarged state, and hence the image capture angle is narrowed. In other words, as the image capture angle is narrower, it is necessary to illuminate the subject which is farther from the image capture apparatus. On the other hand, assuming that the amount of light flux of illumination is constant, it is possible to make the light flux (luminous intensity) per unit angle larger by making the light distribution angle narrower.

Therefore, in a case where the image capture angle of the single-eye image capture section 220 is narrow, it is preferable to increase the luminous intensity by using the narrow-angle illumination section 225a having the narrow light distribution angle. On the other hand, in a case where the image capture angle of the single-eye image capture section 220 is wide, it is preferable to enlarge the irradiation range by using the wide-angle illumination section 225b having the wide light distribution angle. This makes it possible to efficiently illuminate a subject an image of which is desired to be captured.

In the image capture apparatus 200, the exposure levels of a plurality of image capture sections 211a to 211d forming a multi-eye image capture section 210 are controlled based on the image capture angle of the single-eye image capture section 220. More specifically, as the image capture angle of the single-eye image capture section 220 is narrower, the difference between the exposure level of one of the image capture sections 211a to 211d, which has an image capture range at least partially overlapping with the image capture range of the single-eye image capture section 220, and the exposure level of another of the same, which has an image capture range not overlapping with the image capture range of the single-eye image capture section 220, is made larger.

With this configuration, it is possible to reduce luminance unevenness of a wide-angle image 201 as well, which is caused by a change in the illumination intensity distribution occurring when the image capture angle of the single-eye image capture section 220 is changed, and hence, it is more preferable.

The following description is given, with reference to FIGS. 5A to 5C and 6A to 6C, of exposure level control for the multi-eye image capture section 210 in a case where the image capture range of the single-eye image capture section 220 overlaps only with the image capture range of one image capture section 211a of the multi-eye image capture section 210 and does not overlap with the image capture ranges of the other image capture sections 211b to 211d.

Here, FIG. 5A and FIG. 6A, each showing the image capture apparatus 200, are different in the image capture angle of the single-eye image capture section 220, i.e. the image capture angle of the single-eye image capture section 220 is wider in a case of exposure level control described with reference to FIGS. 6A to 6C than in a case of exposure level control described with reference to FIGS. 5A to 5C.

As described above, in the image capture apparatus 200 according to the second embodiment, as the image capture angle of the single-eye image capture section 220 is narrower, the light distribution angle of illumination from the illumination section 225 is narrower. For this reason, as shown in FIGS. 5B and 6B, as the image capture angle of the single-eye image capture section 220 is narrower, the peak value of the illumination intensity from the illumination section 225 is larger. Therefore, as shown in FIGS. 5C and 6C, as the image capture angle of the single-eye image capture section 220 is narrower, the difference in the exposure level between the image capture section 211a and the image capture sections 211b to 211d is made larger. This makes it possible to reduce luminance unevenness of the wide-angle image 201 generated by synthesis.

Next, a description will be given of a third embodiment. Component elements of the present embodiment are denoted by reference numerals of 300s. Further, the same component elements as those of the first embodiment are denoted by reference numerals which are changed from 100s to 300s, and redundant description is omitted. Further, a functional block diagram of an image capture apparatus 300 according to the third embodiment, which corresponds to FIGS. 1C and 1s mainly different only in the reference numerals from that shown in FIG. 1C, is omitted, but the description is given using the changed reference numerals. This is also the case with the other embodiments described hereinafter.

The image capture apparatus 300 according to the third embodiment differs from the image capture apparatus 100 according to the first embodiment in that image capture sections 311a to 311d of a multi-eye image capture section 310 include photometry sections 315a to 315d, respectively, each of which acquires a photometric value from an image obtained through image capture. The photometry sections 315a to 315d acquire photometric values which are average signal levels of images captured by the image capture sections 311a to 311d of the multi-eye image capture section 310, from pixel signals read from solid-state image capture devices 313a to 313d, respectively. In doing this, a controller 330 may set a range from which each of the photometry sections 315a to 315d calculates the photometric value (hereinafter referred to as an evaluation frame) only to part of the image, and may acquire a photometric value by performing weighted-averaging depending on an area of the image.

Then, the exposure levels of the image capture sections 311a to 311d are controlled based not only on the image capture angle direction of a single-eye image capture section 320, but also on the photometric values acquired by the photometry sections 315a to 315d, respectively. With this configuration, it is possible to further improve the quality of a wide-angle image 301, and hence it is preferable.

The following description is given, with reference to FIGS. 7A to 7C, of exposure level control for the multi-eye image capture section 310 in a case where the image capture range of the single-eye image capture section 320 overlaps only with the image capture range of one image capture section 311a of the multi-eye image capture section 310 and does not overlap with the image capture ranges of the other image capture sections 311b to 311d.

As described above, the peak of the intensity of illumination from an illumination section 325 is included in the image capture range of the image capture section 311a, which overlaps with the image capture range of the single-eye image capture section 320. However, as shown in FIG. 7B, the illumination intensity of the image capture range of each of the image capture sections 311a to 311d also varies with distribution of environment light other than illumination light from the illumination section 325.

In other words, although the difference between the illumination intensity in the image capture range of the image capture section 311a and the illumination intensities in the image capture ranges of the image capture section 311b to 311d is mainly determined by illumination light from the illumination section 325, the difference also depends on the distribution of environment light, to be exact. Therefore, in the image capture apparatus 300 according to the third embodiment, the photometric values of the image capture sections 311a to 311d are acquired, and the difference in exposure level between the image capture section 311a and the image capture sections 311b to 311d is adjusted to further reduce luminance unevenness of the wide-angle image 301.

Note that the image capture apparatus 300 controls the exposure level using both of the information on the image capture direction of the single-eye image capture section 320 and the information on the photometric values acquired by the photometry sections 315a to 315d, respectively. This makes it easier to adjust the exposure level than the control of the exposure level only using the photometric values. The following description is given of the exposure level control.

Figure 8:
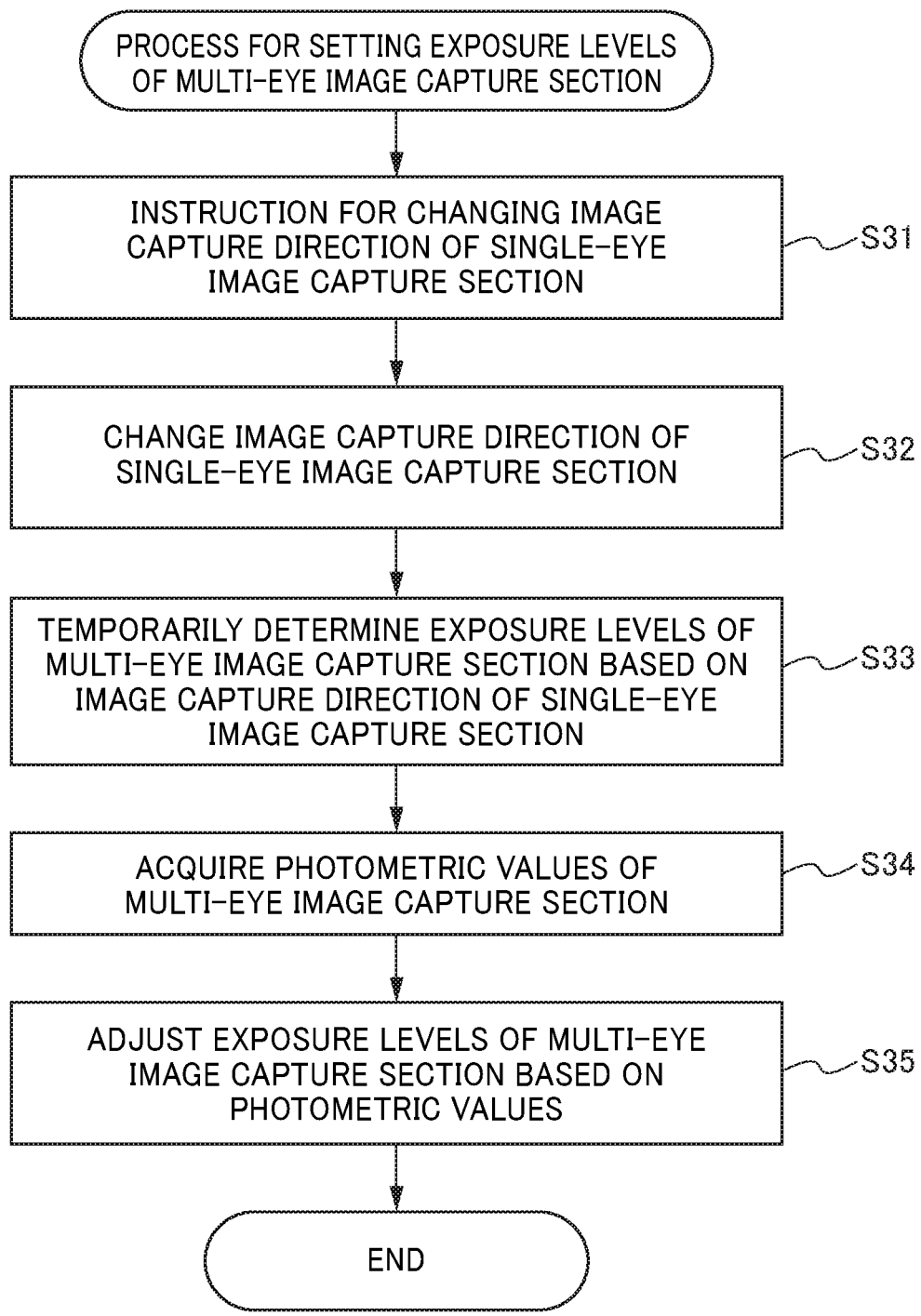
FIG. 8 is a flowchart of a process performed by the image capture apparatus according to the third embodiment, for setting the exposure level of each image capture section of the multi-eye image capture section.

FIG. 8 is a flowchart of a process for setting the exposure levels of the multi-eye image capture section 310. The present process is performed by the controller 330 of the image capture apparatus 300, and the exposure levels of the image capture sections 311a to 311d are set according to the image capture direction of the single-eye image capture section 320.

More specifically, first, in a step S31, a user instructs the image capture apparatus 300 to change the image capture direction of the single-eye image capture section 320 from the client apparatus.

This instruction for changing the image capture direction is transmitted to the image capture apparatus 300 via the network, and the controller 330 controls a drive mechanism 324 to change the image capture direction of the single-eye image capture section 320 (step S32).

The exposure levels of the image capture sections 311a to 311d of the multi-eye image capture section 310 are temporarily determined so as to offset luminance differences caused by the illumination intensity of light emitted from the illumination section 325 in the changed image capture direction of the single-eye image capture section 320 (step S33). That is, the exposure levels are temporarily determined such that the exposure level of any of image capture sections 111a to 111d of the multi-eye image capture section 310, which has an image capture range at least partially overlapping with the image capture range of the single-eye image capture section 320, is lower than the exposure level(s) of image capture section(s) each having an image capture range not overlapping with the image capture range of the single-eye image capture section 320.

After that, image capture is performed by the image capture sections 311a to 311d at the exposure levels determined in the step S33, respectively, and photometric values are acquired by the photometry sections 315a to 315d from images acquired from the image capture sections 311a to 311d, respectively (step S34).

Then, in a step S35, the exposure levels of the image capture sections 311a to 311d of the multi-eye image capture section 310 are adjusted using the photometric values acquired by the photometry sections 315a to 315d in the step S34. Then, image capture is performed again by the image capture sections 311a to 311d of the multi-eye image capture section 310, and the wide-angle image 301 is generated based on the images obtained through image capture.

The exposure levels may be adjusted, as conventionally performed, by omitting the step S33, i.e. without temporarily determining the exposure levels of the image capture sections 311a to 311d of the multi-eye image capture section 310, and based on the photometric values acquired from the images obtained through image capture performed by the image capture sections 311a to 311d of the multi-eye image capture section 310 in the step S34. In this case, however, a plurality of frames are needed or a large luminance difference is generated between the frames, before the exposure level becomes stable at the optimum exposure level.

In contrast, by temporarily determining the exposure levels of the image capture sections 311a to 311d based on the information on the image capture direction of the single-eye image capture section 320 in the step S33, it is made easier to adjust the exposure levels in the step S35. As a result, it is possible to reduce time taken to perform image capture at the optimum exposure levels, and hence the process shown in FIG. 8 is preferable.

As described above, according to the present embodiment, it is possible to reduce luminance unevenness of the wide-angle image 301 more effectively than in a case where the exposure level is adjusted only based on the image capture direction of the single-eye image capture section 320, and further, it is possible to more easily adjust the exposure level than in a case where the exposure level is adjusted using only the photometric values of the image capture sections 311a to 311d.

Note that the controller 330 may set an evaluation frame within which each associated one of the photometry sections 315a to 315d acquires a photometric value, based on the image capture direction of the single-eye image capture section 320. More specifically, for one(s) of the image capture sections 311a to 311d of the multi-eye image capture section 310, each of which has an image capture range at least partially overlapping with the image capture range of the single-eye image capture section 320, it is preferable to set a central portion of the image as the evaluation frame. This makes it possible to more positively grasp the peak of illumination intensity caused by the illumination section 325. On the other hand, for ones of the image capture sections 311a to 311d of the multi-eye image capture section 310, each of which has an image capture range not overlapping with the image capture range of the single-eye image capture section 320, it is preferable to set the whole image as the evaluation frame. This makes it possible to positively grasp an influence of environment light on the photometric value. That is, it is preferable that the controller 330 sets a narrower area including the central portion of the acquired image as the evaluation frame for one of the image capture sections 311a to 311d of the multi-eye image capture section 310, which has an image capture range closer to the image capture direction of the single-eye image capture section 320.

Next, a description will be given of a fourth embodiment. Component elements of the present embodiment are denoted by reference numerals of 400s. Further, the same component elements as those of the first embodiment are denoted by reference numerals which are changed from 100s to 400s, and redundant description is omitted.

An image capture apparatus 400 according to the fourth embodiment differs from the image capture apparatus 100 according to the first embodiment in component elements of image capture sections 411a to 411d of a multi-eye image capture section 410. More specifically, the image capture sections 411a to 411d include focus control mechanisms 415a to 415d, respectively, each of which is capable of controlling a focal length. It is only required that the focus control mechanisms 415a to 415d are each configured to include a motor and a gear and change the focal length by moving the position of a focus lens of an associated one of image forming optical systems 412a to 412d in the optical axis direction. Further, a single-eye image capture section 420 includes a photometry section 426 (environment light-measuring section) which measures brightness of environment light as a photometric value, and an image capture mode is set to a day mode when the brightness measured by the photometry section 426 is not lower than a predetermined value, and set to a night mode when the measured brightness is lower than the predetermined value.

The image capture apparatus 400 controls the focal lengths of the image capture sections 411a to 411d of the multi-eye image capture section 410 based on the image capture direction of the single-eye image capture section 420. More specifically, the focal length of an image capture section of the image capture sections 411a to 411d of the multi-eye image capture section 410, which has an image capture range at least partially overlapping with the image capture range of the single-eye image capture section 420, is controlled to a different value from the focal length of an image capture section having an image capture range not overlapping with the image capture range of the single-eye image capture section 420. With this configuration, it is possible to further improve the image quality of a wide-angle image 401. The following description will be given of this control.

Here, let us assume a case where the image capture apparatus 400 is used as a surveillance monitor provided at an entrance of a store or a parking lot. In this case, it is preferable to continuously perform image capture while focusing on a specified image capture area (the entrance in this case). Further, in a case where the image capture apparatus 400 is used e.g. for monitoring an assembly process in a factory, or used as an on-vehicle camera for detecting obstacles, it is also preferable to continuously perform image capture while focusing on a specified image capture area.

However, in general, the image forming optical system has chromatic aberration, and hence the focal length is different depending on a wavelength of light entering the image forming optical system. Particularly, as the wavelength difference is larger, the difference in focal length is larger. As a result, the following problem is caused:

For example, let us assume a case where after the focal lengths are set by the focus control mechanisms 415a to 415d so as to focus on a subject in daytime during which visible light mainly enters the image forming optical systems 412a to 412d, near-infrared light is irradiated using an illumination section 425 during nighttime. Then, the focal length in one of the image capture ranges of the image capture sections 411a to 411d, which is irradiated by the illumination section 425, is shifted due to chromatic aberration between visible light and near-infrared light, resulting in a state in which the subject is out of focus. This problem is marked in nighttime in which the near-infrared light irradiated by the illumination section 425 mainly enters the image forming optical systems 412a to 415d.

To solve this problem, in the present embodiment, the position of the focus lens of any of the image capture sections 411a to 411d of the multi-eye image capture section 410, which has an image capture range at least partially overlapping with the image capture range of the single-eye image capture section 420, is set again at nighttime. By doing this, the plurality of image capture sections 411a to 411d can perform image capture in a state in which the same subject is in focus. Further, this enables the image capture sections 411a to 411d of the multi-eye image capture section 410 to perform image capture in the state in which the same subject is in focus regardless of daytime or nighttime, and hence is preferable.

To fix the focal length between the image capture sections 411a to 411d of the multi-eye image capture section 410 irrespective of illumination light, it is only required to employ the following method:

First, a controller 430 acquires information on a table shown in FIG. 9 in advance, which shows a relationship between the position of the focus lens and the focal length of the image forming optical systems 412a to 412d, for each wavelength of transmitted light.

Next, in a case where the brightness not lower than the predetermined value is measured by the photometry section 426, i.e. in a case where it is determined that it is daytime, the controller 430 adjusts the position of the focus lens to a position where the subject is in focus based on various focusing processing, including contrast AF or phase difference AF. For example, the position of the focus lens is adjusted to PVI_1, which is a focus lens position at time when visible light enters, indicated in the table shown in FIG. 9.

Then, in a case where the brightness lower than the predetermined value is measured by the photometry section 426, i.e. in a case where it is determined that it is nighttime, the controller 430 starts to use the illumination section 425. After starting to use the illumination section 425, the controller 430 judges that in any of the image capture sections 411a to 411d of the multi-eye image capture section 410, which has an image capture range at least partially overlapping with the image capture range of the single-eye image capture section 420, the wavelength of light transmitted through the image forming optical system thereof has changed.

The position of the focus lens of the image capture section determined as described above is adjusted to a focus lens position at time which infrared light enters, which is associated with the focal length set as above, based on the table shown in FIG. 9 (lens position adjustment unit). For example, in a case where the position of the focus lens in daytime is set to PVI_1 as in the example described above, the position of the focus lens is changed from PVI_1 to PIR_1 for the image capture section determined as above.

Next, a description will be given of a fifth embodiment. Component elements of the present embodiment are denoted by reference numerals 500s. Further, the same component elements as those of the first embodiment are denoted by reference numerals which are changed from 100s to 500s, and redundant description is omitted.

An image capture apparatus 500 according to the fifth embodiment is capable of switching the image capture mode between a day mode in which an image is acquired only with visible light, and a night mode in which an image is acquired with both of visible light and near-infrared light.

More specifically, the image capture mode is set to the day mode in a case where the brightness measured by a photometry section 526 is not lower than the predetermined value, and is set to the night mode in a case where the measured brightness is lower than the predetermined value. Further, a plurality of image capture sections 511a to 511d of a multi-eye image capture section 510 and an image capture section 521 of a single-eye image capture section 520 each include an infrared cut filter which selectively transmits visible light and selectively absorbs near-infrared light, and an insertion/removal mechanism for inserting and removing the infrared cut filter. Here, the visible light refers to light having a wavelength from 380 nm to 750 nm, and the near-infrared light refers to light having a wavelength from 750 nm to 1100 nm. Further, the wavelength of illumination light irradiated from an illumination section 525 of the single-eye image capture section 520 corresponds to near-infrared light.

The image capture apparatus 500 has the day mode in which the infrared cut filters are inserted into the multi-eye image capture section 510 and the single-eye image capture section 520, respectively, and the night mode in which the infrared cut filters are removed from both of the multi-eye image capture section 510 and the single-eye image capture section 520. When the image capture apparatus 500 is in the night mode, image capture is performed using the illumination section 525 of the single-eye image capture section 520.

In the night mode, the infrared cut filter in the single-eye image capture section 520 is removed and the illumination section 525 in the single-eye image capture section 520 is used. In this case, the exposure levels of the image capture sections 511a to 511d of the multi-eye image capture section 510 are controlled based on the image capture direction of the single-eye image capture section 520. With this configuration, it is possible to reduce luminance unevenness of a wide-angle image 501. On the other hand, the illumination section 525 is not used in the day mode and hence it is only required that a fixed exposure level is set irrespective of the image capture direction of the single-eye image capture section 520.

Note that the image capture apparatus 500 may be configured such that in addition to the day mode and the night mode, there is provided a hybrid mode in which the infrared cut filter of one of the multi-eye image capture section 510 and the single-eye image capture section 520 is removed, and the infrared cut filter of the other is inserted.

For example, in a case where the sensitivity of a solid-state image capture device 523 of the single-eye image capture section 520 is lower than those of solid-state image capture devices 513a to 513d of the multi-eye image capture section 510, it is preferable to set the image capture mode to a mode in which the infrared cut filters of the multi-eye image capture section 510 are inserted, and the infrared cut filter of the single-eye image capture section 520 is removed. At this time, it is preferable to improve the SN ratio of a detailed image 502 acquired by the single-eye image capture section 520 by using the illumination section 525 of the single-eye image capture section 520. However, since the infrared cut filters are inserted into the multi-eye image capture section 510, near-infrared light irradiated by the illumination section 525 does not enter the solid-state image capture devices 513a to 513d of the multi-eye image capture section 510. Therefore, it is only required that a fixed exposure level is set for the image capture sections 511a to 511d of the multi-eye image capture section 510 irrespective of the image capture direction of the single-eye image capture section 520.

In a case where the sensitivities of the solid-state image capture devices 513a to 513d of the multi-eye image capture section 510 are lower than that of the solid-state image capture devices 523 of the single-eye image capture section 520, it is preferable to set the image capture mode to a mode in which the infrared cut filters of the multi-eye image capture section 510 are removed, and the infrared cut filter of the single-eye image capture section 520 is inserted. This is because the multi-eye image capture section 510 cannot acquire an image of sufficient quality only with visible light even at an illumination intensity which enables the single-eye image capture section 520 to acquire an image of sufficient quality only with the visible light.

At this time, it is more preferable to perform image capture using the illumination section 525 of the single-eye image capture section 520 because the SN ratio of the wide-angle image 501 acquired by the multi-eye image capture section 510 is improved. Further, by controlling the exposure levels of the image capture sections 511a to 511d of the multi-eye image capture section 510 based on the image capture direction of the single-eye image capture section 520, it is possible to reduce luminance unevenness caused by illumination distribution.

FIG. 10 shows whether or not to perform the above-described exposure level control based on the image capture direction of the single-eye image capture section 520 in the case where the mechanism for inserting and removing the infrared cut filter is included in each of the multi-eye image capture section 510 and the single-eye image capture section 520. That is, whether or not to perform the exposure level control in the image capture apparatus 500 is determined based on whether the infrared cut filter of each of the multi-eye image capture section 510 and the single-eye image capture section 520 is inserted or removed, whether or not the illumination section 525 is used, and the image capture direction of the single-eye image capture section 520, in each of the above-described modes. More specifically, in a case where image capture is performed using the illumination section 525 in a state in which the infrared cut filters of the multi-eye image capture section 510 have been removed by the insertion/removal mechanism, the exposure level control is performed. By thus switching the exposure level control method according to the image capture mode, it is possible to reduce luminance unevenness of the wide-angle image 501 irrespective of the image capture mode.

Further, a solid-state image capture device having pixels for visible light and pixels for near-infrared light (hereinafter referred to as the RGBIR sensor) may be used as one or both of each of the solid-state image capture devices 513a to 513d of the multi-eye image capture section 510 and the solid-state image capture device 523 of the single-eye image capture section 520. More specifically, a solid-state image capture device may be used in which on-chip color filters of some of pixels in the RGB Bayer array are replaced by color filters capable of transmitting only near-infrared light. On the other hand, a solid-state image capture device having only pixels for visible light in the RGB Bayer array is referred to as the RGB sensor.

Further, in a case where the multi-eye image capture section 510 has RGB sensors as the solid-state image capture devices 513a to 513d, the multi-eye image capture section 510 further includes photometry sections 515a to 515d which measure brightness of the image capture ranges of the image capture sections 511a to 511d, respectively. Insertion/removal of the infrared cut filters into/from the multi-eye image capture section 510 is determined according to the brightness values measured by the photometry sections 515a to 515d.

On the other hand, in a case where the single-eye image capture section 520 has an RGB sensor as the solid-state image capture device 523, insertion/removal of the infrared cut filter into/from the single-eye image capture section 520 is determined according to the brightness measured by the photometry section 526.

FIGS. 11A to 11C show whether or not to perform exposure level control for the image capture sections 511a to 511d of the multi-eye image capture section 510 based on the image capture direction of the single-eye image capture section 520 in a case where one or both of the multi-eye image capture section 510 and the single-eye image capture section 520 has/have (an) RGBIR sensor(s). By thus switching whether or not to perform the exposure level control according to the image capture mode, it is possible to reduce luminance unevenness of the wide-angle image 501 irrespective of the image capture mode.

Note that if the infrared cut filter is inserted into an image capture section having the RGBIR sensor, infrared light is prevented from entering the pixels for near-infrared light. For this reason, no infrared cut filter is used in one(s) of the multi-eye image capture section 510 and the single-eye image capture section 520, in which the RGBIR sensor(s) is/are used. That is, in a case shown in FIG. 11A, where the RGBIR sensors are used only in the multi-eye image capture section 510, no infrared cut filters are used in the multi-eye image capture section 510. Further, in a case shown in FIG. 11B, where the RGBIR sensor is used only in the single-eye image capture section 520, no infrared cut filter is used in the single-eye image capture section 520. Similarly, in a case shown in FIG. 11C, where the RGBIR sensors are used in both of the multi-eye image capture section 510 and the single-eye image capture section 520, no infrared cut filter is used in either of the multi-eye image capture section 510 and the single-eye image capture section 520.

In a case where the multi-eye image capture section 510 has the RGBIR sensors and the single-eye image capture section 520 has the RGB sensor, the exposure level control is performed as indicated by the table shown in FIG. 11A.

A first row of settings in the table shown in FIG. 11A indicates the control in a case where the brightness measured by the photometry section 526 is not lower than a first predetermined value (the image capture range of the single-eye image capture section 520 is bright) and the brightness values measured by the photometry sections 515a to 515d are not lower than a second predetermined value (the image capture range of the multi-eye image capture section 510 is bright). In this case, the infrared cut filter is inserted into the single-eye image capture section 520, and the illumination section 525 is not used.

A second row of settings in the table shown in FIG. 11A indicates the control in a case where the brightness measured by the photometry section 526 is not lower than the first predetermined value, but the brightness values measured by the photometry sections 515a to 515d are lower than the second predetermined value (the image capture range of the multi-eye image capture section 510 is dark). In this case, the infrared cut filter is inserted into the single-eye image capture section 520, but the illumination section 525 is used to brighten the image capture range of the multi-eye image capture section 510.

A third row of settings in the table shown in FIG. 11A indicates the control in a case where the brightness measured by the photometry section 526 is lower than the first predetermined value and the brightness values measured by the photometry sections 515a to 515d are also lower than the second predetermined value. In this case, the infrared cut filter is removed from the single-eye image capture section 520 and the illumination section 525 is used to brighten the image capture range of the single-eye image capture section 520.

In the case of FIG. 11A, the control based on the second and third rows of settings is performed such that the exposure levels of the image capture sections 511a to 511d of the multi-eye image capture section 510 are adjusted to eliminate an influence of the use of the illumination section 525.

Further, in a case where the multi-eye image capture section 510 has the RGB sensors and the single-eye image capture section 520 has the RGBIR sensor, the exposure level control indicated by the table shown in FIG. 11B is performed.

A first row of settings in the table shown in FIG. 11B indicates the control in a case where the brightness measured by the photometry section 526 is not lower than the first predetermined value (the image capture range of the single-eye image capture section 520 is bright) and the brightness values measured by the photometry sections 515a to 515d are not lower than the second predetermined value (the image capture range of the multi-eye image capture section 510 is bright). In this case, the infrared cut filters are inserted into the multi-eye image capture section 510 and the illumination section 525 is not used.

A second row of settings in the table shown in FIG. 11B indicates the control in a case where the brightness measured by the photometry section 526 is lower than the first predetermined value (the image capture range of the single-eye image capture section 520 is dark) but the brightness values measured by the photometry sections 515a to 515d are not lower than the second predetermined value (the image capture range of the multi-eye image capture section 510 is bright). In this case, the infrared cut filters are inserted into the multi-eye image capture section 510 and the illumination section 525 is not used.

A third row of settings in the table shown in FIG. 11B indicates the control in a case where the brightness measured by the photometry section 526 is not lower than the first predetermined value (the image capture range of the single-eye image capture section 520 is bright) and the brightness values measured by the photometry sections 515a to 515d are lower than the second predetermined value (the image capture range of the multi-eye image capture section 510 is dark). In this case, the infrared cut filter is removed from the multi-eye image capture section 510 and the illumination section 525 is not used.

A fourth row of settings in the table shown in FIG. 11B indicates the control in a case where the brightness measured by the photometry section 526 is lower than the first predetermined value (the image capture range of the single-eye image capture section 520 is dark) and the brightness values measured by the photometry sections 515a to 515d are lower than the second predetermined value (the image capture range of the multi-eye image capture section 510 is dark). In this case, the infrared cut filters are removed from the multi-eye image capture section 510 and the illumination section 525 is used.

Note that even when the illumination section 525 is used, near-infrared light irradiated by the illumination section 525 does not enter the solid-state image capture devices 513a to 513d of the multi-eye image capture section 510 when the infrared cut filters are inserted into the multi-eye image capture section 510. Therefore, the exposure level adjustment is performed only in a state in which the illumination section 525 is used and also the infrared cut filters are removed from the multi-eye image capture section 510 (the case indicated by the fourth row of the settings in the table shown in FIG. 11B).

Further, in a case where both of the multi-eye image capture section 510 and the single-eye image capture section 520 have the RGBIR sensors, no infrared cut filter is used in either the multi-eye image capture section 510 or the single-eye image capture section 520. Therefore, in this case, the exposure level control is performed only based on a condition of use/non-use of the illumination section 525, as indicated by the table shown in FIG. 11C.

Note that in a case where the RGB sensors are used in both of the multi-eye image capture section 510 and the single-eye image capture section 520, whether or not to perform the exposure level control may be switched as shown in FIG. 10.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-161685 filed Aug. 30, 2018, which is hereby incorporated by reference herein in its entirety.

What is claimed is:

1. An image capture apparatus comprising:
a multi-eye image capture portion comprising a plurality of image capture sections that capture images in image capture ranges partially overlapping with each other so as to generate a wide-angle image;
a single-eye image capture portion that is capable of capturing an image in part of the image capture ranges of the multi-eye image capture portion and is capable of changing an image capture direction;
an illumination section that has a peak of illumination intensity within a first image capture range of the single-eye image capture portion;
at least one memory that stores a set of instructions; and
at least one processor that executes the instructions, the instructions, when executed, causing the image capture apparatus to perform operations comprising:
controlling, when performing image capture using the illumination section, a first exposure level of a first image capture section of the plurality of image capture sections of the multi-eye image capture portion such that the first exposure level of the first image capture section becomes lower than a second exposure level of a second image capture section of the plurality of image capture sections, wherein an image capture range of the first image capture section of the plurality of image capture sections overlaps with the first image capture range of the single-eye image capture portion, and wherein an image capture range of the second image capture section of the plurality of image capture sections does not overlap with the first image capture range of the single-eye image capture portion.

2. The image capture apparatus according to claim 1, wherein the instructions further include an instruction for controlling an exposure level of an image capture section of the plurality of image capture sections of the multi-eye image capture portion, which captures an image in an image capture range closer to the image capture direction of the single-eye image capture portion, to be lower.

3. The image capture apparatus according to claim 1, wherein the instructions further include an instruction for setting, in a case where spread of illumination intensity distribution by the illumination section is narrower than the first image capture range of the single-eye image capture portion and the second image capture section exists in plurality, the second exposure level of the second image capture sections to a common value.

4. The image capture apparatus according to claim 1, wherein the instructions further include an instruction for performing, in a case where the peak of the illumination intensity of the illumination section coincides with the image capture direction of the single-eye image capture portion, shading correction for making higher a pixel signal level of an image capture section of the plurality of image capture sections of the multi-eye image capture portion, as the image capture section is farther from the image capture direction of the single-eye image capture portion.

5. The image capture apparatus according to claim 1, wherein the plurality of image capture sections forming the multi-eye image capture portion each include an illumination section having a peak of illumination intensity within an image capture range thereof.

6. The image capture apparatus according to claim 1, wherein the instructions further include an instruction for controlling a frame rate of the second image capture section such that the frame rate becomes lower than a frame rate of the first image capture section.

7. The image capture apparatus according to claim 1, wherein the illumination section includes a narrow-angle illumination section and a wide-angle illumination section which is wider in light distribution angle than the narrow-angle illumination section, and uses the narrow-angle illumination section for illumination during image capture in a case where an image capture angle of the single-eye image capture portion is smaller than a predetermined angle, and the wide-angle illumination section for illumination during image capture in a case where the image capture angle of the single-eye image capture portion is not smaller than the predetermined angle.

8. The image capture apparatus according to claim 1, further comprising a zoom control mechanism that is capable of changing the image capture angle of the single-eye image capture portion,
wherein the instructions further include an instruction for making a difference larger between the first exposure level of the first image capture section and the second exposure level of the second image capture section as the image capture angle of the single-eye image capture portion is narrower.

9. The image capture apparatus according to claim 1, wherein the instructions further include instructions for:
temporarily determining the exposure level of the first image capture section such that the exposure level becomes a value lower than the exposure level of the second image capture section in a case where the image capture direction of the single-eye image capture portion is changed,
causing the plurality of image capture sections to perform image capture at the temporarily determined exposure levels to acquire images from the plurality of image capture sections, respectively,
acquiring a photometric value from an image acquired through image capture by each of the plurality of image capture sections of the multi-eye image capture portion, and
adjusting the exposure levels of the plurality of image capture sections using the acquired photometric values, respectively.

10. The image capture apparatus according to claim 1, wherein the instructions further include instructions for:
setting a range for calculating the photometric value, in part of the acquired image, as an evaluation frame, and
setting a narrower area including a central portion of the acquired image as the evaluation frame for an image capture section of the plurality of image capture sections of the multi-eye image capture portion, which has an image capture range closer to the image capture direction of the single-eye image capture portion.

11. The image capture apparatus according to claim 1, wherein a wavelength of illumination of the illumination section corresponds to near-infrared light,
wherein the multi-eye image capture portion and the single-eye image capture portion each further include an infrared cut filter which selectively transmits visible light and selectively absorbs near-infrared light, and an insertion/removal mechanism for inserting and removing the infrared cut filter, and
wherein the instructions further include instructions for:
performing exposure level control for the plurality of image capture sections of the multi-eye image capture portion in a case where image capture is performed using the illumination section in a state in which the infrared cut filters of the multi-eye image capture portion are removed by the insertion/removal mechanism.

12. The image capture apparatus according to claim 11, wherein at least one of the multi-eye image capture portion and the single-eye image capture portion includes a solid-state image capture device having pixels for visible light and pixels for near-infrared light.

13. The image capture apparatus according to claim 11, wherein the plurality of image capture sections of the multi-eye image capture portion each include a focus control mechanism which is capable of controlling a focal length by moving a position of a focus lens, and the single-eye image capture portion further includes an environment light photometry section which measures brightness of environment light, and
wherein the instructions further include instructions for:
(a) causing the focus control mechanism to move each associated one of all focus lenses of the plurality of image capture sections of the multi-eye image capture portion to a first focus lens position when visible light enters, in a case where brightness measured by the environment light photometry section is not lower than a predetermined value, and
(b) starting to use the illumination section and adjusting a position of the focus lens of the first image capture section to a second focus lens position when infrared light enters, such that a focal length of the focus lens corresponds to the first focus lens position at a time when visible light enters, in a case where brightness measured by the environment light photometry section is lower than the predetermined value.

14. The image capture apparatus according to claim 1, wherein the instructions further include an instruction for generating the wide-angle image.

15. The image capture apparatus according to claim 1, wherein the instructions further include an instruction for outputting the plurality of images to an external apparatus that generates the wide-angle image.

16. A monitoring system including an image capture apparatus and an information processing apparatus,
wherein the image capture apparatus comprises:

(a) a multi-eye image capture portion having a plurality of image capture sections that capture images in image capture ranges partially overlapping with each other so as to generate a wide-angle image;
(b) a single-eye image capture portion that is capable of capturing an image in part of the image capture ranges of the multi-eye image capture portion and is capable of changing an image capture direction;
(c) an illumination section that has a peak of illumination intensity within a first image capture range of the single-eye image capture portion;
(d) at least one memory that stores a set of instructions; and
(e) at least one processor that executes the instructions, the instructions, when executed, causing the image capture apparatus to perform operations comprising:
controlling, when performing image capture using the illumination section, a first exposure level of a first image capture section of the plurality of image capture sections of the multi-eye image capture portion, such that the first exposure level of the first image capture section becomes lower than a second exposure level of a second image capture section of the plurality of image capture sections, wherein an image capture range of the first image capture section of the plurality of image capture sections overlaps with the first image capture range of the single-eye image capture portion, and wherein an image capture range of the second image capture section of the plurality of image capture sections does not overlap with the first image capture range of the single-eye image capture portion, and
wherein the information processing apparatus displays the wide-angle image and an image captured by the single-eye image capture portion, and transmits an instruction for controlling the image capture apparatus to the image capture apparatus.

17. A method of controlling an image capture apparatus including (a) a multi-eye image capture portion having a plurality of image capture sections that capture images in image capture ranges partially overlapping with each other so as to generate a wide-angle image, (b) a single-eye image capture portion that is capable of capturing an image in part of the image capture ranges of the multi-eye image capture portion and is capable of changing an image capture direction, and (c) an illumination section that has a peak of illumination intensity within a first image capture range of the single-eye image capture portion, the method comprising:
controlling, when performing image capture using the illumination section, a first exposure level of a first image capture section of the plurality of image capture sections of the multi-eye image capture portion such that the first exposure level of the first image capture section becomes lower than a second exposure level of a second image capture section of the plurality of image capture sections, wherein an image capture range of the first image capture section of the plurality of image capture sections overlaps with the first image capture range of the single-eye image capture portion, and wherein an image capture range of the second image capture section of the plurality of image capture sections does not overlap with the first image capture range of the single-eye image capture portion.

18. A non-transitory computer-readable storage medium storing a computer-executable program for executing a method of controlling an image capture apparatus including (a) a multi-eye image capture portion having a plurality of image capture sections that capture images in image capture ranges partially overlapping with each other so as to generate a wide-angle image, (b) a single-eye image capture portion that is capable of capturing an image in part of the image capture ranges of the multi-eye image capture portion and is capable of changing an image capture direction, and (c) an illumination section that has a peak of illumination intensity within a first image capture range of the single-eye image capture portion, wherein the method comprises:
controlling, when performing image capture using the illumination section, a first exposure level of a first image capture section of the plurality of image capture sections of the multi-eye image capture portion such that the first exposure level of the first image capture section becomes lower than a second exposure level of a second image capture section of the plurality of image capture sections, wherein an image capture range of the first image capture section of the plurality of image capture sections overlaps with the first image capture range of the single-eye image capture portion, and wherein an image capture range of the second image capture section of the plurality of image capture sections does not overlap with the first image capture range of the single-eye image capture portion.

* * * * *